United States Patent
Ogawa et al.

(10) Patent No.: US 11,950,592 B2
(45) Date of Patent: Apr. 9, 2024

(54) METHOD FOR ENHANCING PLANT DISEASE CONTROLLING EFFECTS OF ARYL PHENYL KETONE FUNGICIDE, AND METHOD FOR CONTROLLING PLANT DISEASES

(71) Applicant: ISHIHARA SANGYO KAISHA, LTD., Osaka (JP)

(72) Inventors: Munekazu Ogawa, Osaka (JP); Akihiro Nishimura, Osaka (JP); Shuko Nishimi, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/092,579

(22) PCT Filed: Apr. 13, 2017

(86) PCT No.: PCT/JP2017/015187
§ 371 (c)(1),
(2) Date: Oct. 10, 2018

(87) PCT Pub. No.: WO2017/179673
PCT Pub. Date: Oct. 19, 2017

(65) Prior Publication Data
US 2019/0150434 A1    May 23, 2019

(30) Foreign Application Priority Data
Apr. 15, 2016 (JP) ................. 2016-081693

(51) Int. Cl.
| A01N 25/30 | (2006.01) |
| A01N 25/00 | (2006.01) |
| A01N 35/04 | (2006.01) |
| A01N 43/40 | (2006.01) |

(52) U.S. Cl.
CPC ............. *A01N 25/30* (2013.01); *A01N 25/00* (2013.01); *A01N 35/04* (2013.01); *A01N 43/40* (2013.01)

(58) Field of Classification Search
CPC ........ A01N 25/00; A01N 43/40; A01N 35/04; A01N 25/35; A01N 25/30; A01G 7/06
See application file for complete search history.

(56) References Cited

U.S. PATENT DOCUMENTS

| 5,922,905 | A | 7/1999 | Curtze et al. | |
| 5,945,567 | A | 8/1999 | Curtze et al. | |
| 6,770,662 | B2 | 8/2004 | Nishide et al. | |
| 9,775,354 | B2 * | 10/2017 | Yamada ................ | A01N 43/42 |
| 9,888,689 | B2 * | 2/2018 | Xu .......................... | A01N 53/00 |
| 2003/0125212 | A1 | 7/2003 | Yamaguchi et al. | |
| 2006/0089390 | A1 | 4/2006 | Nishide et al. | |
| 2011/0028521 | A1 | 2/2011 | Morita et al. | |
| 2014/0128411 | A1 * | 5/2014 | Ogawa ................. | A01N 43/90 |
| | | | | 514/259.31 |

FOREIGN PATENT DOCUMENTS

| CN | 105165828 | 12/2015 |
| EP | 0243322 B1 | 1/1992 |
| EP | 0897904 A1 | 2/1999 |
| EP | 1273230 A1 | 1/2003 |
| EP | 1559320 A1 | 8/2005 |
| EP | 2036436 A1 | 3/2009 |
| JP | H11-171818 A | 6/1999 |
| JP | 2013-523713 A | 6/2013 |
| WO | 02/02527 A1 | 1/2002 |
| WO | 2004/039155 A1 | 5/2004 |
| WO | 2004039155 A1 | 5/2004 |
| WO | 2008/004596 A1 | 1/2008 |
| WO | 2009/128409 A1 | 10/2009 |
| WO | 2014/020109 A1 | 2/2014 |

OTHER PUBLICATIONS

Bernard et al., Pyriofenone: a novel powdery mildew fungicide for grapevine. Association Francaise de Protection des Plantes, (Year: 2012).*
Grove et al., Use of Petroleum Derived Spray Oils in Washington Grapevine Powdery Mildew Management Programs. Plant Health Progress, (Year: 2005).*
Jee et al., Control of Powdery and Downy Mildews of Cucumber by Using Cooking Oils and Yolk Mixture. Plant Pathol. J., vol. 25(3) , pp. 280-285 (Year: 2009).*
Walsh et al., Horticultural Spray Oils. Good Fruit Grower, vol. 51(8), pp. 45-48 (Year: 2000).*
An Office Action and a Search Report, Georgian Patent Office, Application No. AP 2017 14917, dated Sep. 16, 2019, with English translation.
"The Pesticide Manual", 17th Edition, British Crop Protection Council, pp. 766-769, 982-985, 2015.
International Search Report issued with respect to Patent Application No. PCT/JP2017/015187, dated Jun. 27, 2017.
International Preliminary Report on Patentability issued with respect to Patent Application No. PCT/JP2017/015187, dated Oct. 16, 2018.
European Search Report, European Patent Office, Application No. 17782486.9, dated Aug. 12, 2019, 5 pages.
Office Action in corresponding Korean patent application No. 10-2018-7031233, dated Aug. 1, 2021.

(Continued)

*Primary Examiner* — Barbara P Badio
(74) *Attorney, Agent, or Firm* — GREENBLUM & BERNSTEIN, P.L.C.

(57) ABSTRACT

A method for remarkably enhancing plant disease controlling effects, and a method for controlling plant diseases are provided. A method for enhancing plant disease controlling effects of an aryl phenyl ketone fungicide includes using an aryl phenyl ketone fungicide as a component (a) in combination with at least one component (b) selected from the group consisting of a nonionic surfactant, an anionic surfactant, a cationic surfactant, a vegetable oil, a paraffin, a resin and a terpene.

10 Claims, No Drawings

(56) References Cited

OTHER PUBLICATIONS

Wang et al., "Foliar uptake of pesticides—Present status and future challenge", Pesticide Biochemistry and Physiology, Academic Press, US, vol. 87, No. 1, Nov. 11, 2006, pp. 1-8, XP005726058.
Steurbaut, "Adjuvants for Use with Foliar Fungicides", Pesticide Science, vol. 38, No. 2-3, Jan. 1, 1993, pp. 85-91, XP093122864.

\* cited by examiner

METHOD FOR ENHANCING PLANT DISEASE CONTROLLING EFFECTS OF ARYL PHENYL KETONE FUNGICIDE, AND METHOD FOR CONTROLLING PLANT DISEASES

TECHNICAL FIELD

The present invention relates to a method for remarkably enhancing plant disease controlling effects, particularly penetration effects and curative effects of an aryl phenyl ketone fungicide using a component such as a specific surfactant, and a method for controlling plant diseases using a component such as a specific surfactant and an aryl phenyl ketone fungicide.

BACKGROUND ART

Common phytopathogenic fungi cause plant diseases by invading and proliferating of pathogenic fungi inside the cells of parasitic plants. Accordingly, in order to control plant diseases after the onset, only a compound having translocation properties and penetration properties into plant cells can achieve penetration effects, curative effects, etc.

Compounds having translocation properties and penetration properties into plants are likely to penetrate into the plant and may have high controlling effects within a growth optimum temperature within which the plant has active metabolism and remarkably grows (for example, cucumber, eggplant, sweet pepper, water melon, melon, etc.: 25 to 30° C., wheat, barley, etc.: 10 to 25° C., cabbage, Chinese cabbage, strawberry, lettuce, carrot, etc.: 15 to 20° C., tomato, etc.: 15 to 25° C.), however, even compounds having high translocation properties and penetration properties may have lowered translocation properties and penetration properties and sometimes have practically no sufficient controlling effects at temperature lower than the growth optimum temperature.

Most of powdery mildew pathogens (16 genera, about 900 species) are "surface parasites" which parasitize only on the surface of the plant and have such a form that the pathogen remains outside the plant cell and makes only the haustorium infiltrate into the plant cell to obtain nutrition. Accordingly, even compounds having no translocation properties and penetration properties into the plant (for example, sulfur, chlorothalonil, kresoxim-methyl, etc.) and compounds having no sufficient translocation properties and penetration properties to show adequate fungicidal activity inside the plant cell (for example, potassium hydrogencarbonate, iminoctadine, etc.) show curative effects against most of powdery mildew. However, some of powdery mildew pathogens, for example, sweet pepper powdery mildew and pear powdery mildew, are "endoparasites" which parasitize inside the plant body, and against powdery mildew caused by such pathogens, only compounds having high translocation properties and penetration properties have sufficient curative effects, penetration effects, etc.

As representative compounds of an aryl phenyl ketone fungicide, pyriofenone and metrafenone are mentioned, and they are known to be effective against various plant diseases and have excellent preventive effects and curative effects particularly against powdery mildew. Aryl phenyl ketone compounds have translocation properties and penetration properties and are effective against even endoparasitic powdery mildew. However, they sometimes have practically no sufficient controlling effects depending upon the plant growth stage and growth conditions such as the temperature, the humidity and the amount of insolation, for example, at the time of application under temperature conditions lower than the growth optimum temperature.

Patent Document 1 discloses that a benzoylpyridine derivative containing pyriofenone which is an active ingredient of the present invention is useful as a fungicide and further discloses that it may be formulated into various preparations as mixed with various adjuvants as the case requires. However, it failed to specifically disclose a method for enhancing controlling effects by using pyriofenone and a specific surfactant or the like in combination, and it does not disclose a method for enhancing controlling effects of metrafenone at all.

Patent Document 2 discloses that a fungicidal composition comprising a benzoylpyridine derivative or its salt including pyriofenone which is an active ingredient of the present invention, and at least one member selected from the group consisting of eight activity-enhancing ingredients, has improved curative effects against wheat powdery mildew and vapor effects. However, it failed to specifically disclose a method for enhancing penetration effects, curative effects, residual effects, etc. against powdery mildew other than wheat powdery mildew, by using pyriofenone and a specific surfactant or the like in combination, and it does not disclose a method for enhancing controlling effects of metrafenone at all.

Patent Document 3 discloses a fungicidal 2-methoxybenzophenone compound including metrafenone which is an active ingredient of the present invention, and its controlling effects against wheat powdery mildew and cucumber powdery mildew. However, it does not disclose a method for enhancing controlling effects of metrafenone at all.

PRIOR ART DOCUMENTS

Patent Documents

Patent Document 1: WO2002/002527
Patent Document 2: WO2008/004596
Patent Document 3: European Patent Publication No. 897904

DISCLOSURE OF INVENTION

Technical Problem

An aryl phenyl ketone fungicide which is an active ingredient of the present invention has effects against various plant pathogens. However, it sometimes has practically no sufficient controlling effects due to insufficient penetration effects, curative effects, residual effects or fungicidal effects at a temperature lower than the plant growth optimum temperature.

It is an object of the present invention to remarkably enhance controlling effects against various plant pathogens by using an aryl phenyl ketone fungicide and a component such as a specific surfactant in combination to enhance penetration effects, curative effects, etc.

Solution to Problem

The present inventors have conducted extensive studies to solve the above problem and as a result, found that by adding a component such as a specific surfactant when an aryl phenyl ketone fungicide is applied, excellent penetration effects, curative effects, etc. can be obtained, which are unexpected from a case where the aryl phenyl ketone fungicide is used individually, and accomplished the present invention.

That is, the present invention provides a method for enhancing plant disease controlling effects of (a) an aryl phenyl ketone fungicide (hereinafter sometimes referred to simply as a component (a)) by using at least one component selected from the group consisting of a nonionic surfactant, an anionic surfactant, a cationic surfactant, a vegetable oil, a paraffin, a resin and a terpene (hereinafter sometimes referred to simply as a component (b)), and a method for controlling plant diseases, which comprises applying the component (a) and the component (b) to plants or to soil where they grow.

Advantageous Effects of Invention

The present invention, which has stably high controlling effects against plant diseases, is useful for controlling plant diseases.

DESCRIPTION OF EMBODIMENTS

Pyriofenone and metrafenone which are (a) aryl phenyl ketone fungicides are compounds disclosed in The Pesticide Manual (17th edition; BRITISH CROP PROTECTION COUNCIL), respectively at pages 983 to 984 and at pages 767 to 768.

The component (a) may be in a salt form. The salt may be any agriculturally acceptable salt and may, for example, be an alkali metal salt such as a sodium salt or a potassium salt; an alkaline earth metal salt such as a magnesium salt or a calcium salt; an ammonium salt such as a monomethylammonium salt, a dimethylammonium salt or a triethylammonium salt; an inorganic acid salt such as a hydrochloride, a perchlorate, a sulfate or a nitrate; or an organic acid salt such as an acetate, a fumarate or a methanesulfonate.

The nonionic surfactant (b) may, for example, be a silicone surfactant; a polyoxyethylene surfactant; a polyhydric alcohol surfactant; or an alkanolamide surfactant.

The silicone surfactant may, for example, be polyoxyethylene methylpolysiloxane, polyoxyethylene heptamethyltrisiloxane, polyoxyalkylene oxypropylheptamethyltrisiloxane, polyoxyethylene propylheptamethyltrisiloxane, polyalkylene oxide-modified heptamethyltrisiloxane, polyoxyethylene-modified polydimethylsiloxane, polyalkylene oxide-modified polydimethylsiloxane, polyether siloxane, polyether trisiloxane, a polyether/polymethylsiloxane copolymer, a polyether/polydimethylsiloxane copolymer, polyoxyethylene dimethylsiloxane, polyalkylene oxide-modified polymethylsiloxane, polyether-modified polysiloxane, hydroxypropyl heptamethyltrisiloxane or a siloxane/polyalkylene oxide copolymer.

Among them, preferred is polyether siloxane, polyether trisiloxane, polyoxyethylene dimethylsiloxane, hydroxypropyl heptamethyltrisiloxane, polyalkylene oxide-modified polymethylsiloxane, polyether-modified polysiloxane, polyalkylene oxide-modified heptamethyltrisiloxane, a polyether/polymethylsiloxane copolymer or a siloxane/polyalkylene oxide copolymer.

Further, the silicone surfactant may be used as mixed with the after-mentioned polyoxyethylene surfactant, vegetable oil, etc. Among them, the polyoxyethylene surfactant is preferably polyoxyethylene octyl phenyl ether, polyalkylene oxide, alkyl phenol ethoxylate or the like, and the vegetable oil is preferably ethylated rapeseed oil, methylated seed oil, methylated rapeseed oil or the like.

Specific examples of the silicone surfactant include polyether siloxane (tradename: BREAK-THRU OE441; manufactured by EVONIC), polyether trisiloxane (tradename: BREAK-THRU S240, BREAK-THRU S233; manufactured by Degussa), polyoxyethylene dimethylsiloxane (tradename: DYNE-AMIC (a mixture with methylated seed oil); manufactured by Helena Chemical), polyoxyethylene methylpolysiloxane (tradename: KF-640; manufactured by Shin-Etsu Chemical Co., Ltd., tradename: MAKUPIKA; manufactured by Ishihara Sangyo Kaisha, Ltd.), polyalkylene oxide-modified polymethylsiloxane (tradename: KINETIC; manufactured by Helena Chemical), polyoxyethylene propylheptamethyltrisiloxane (tradename: MASIL SF19; manufactured by Emerald), polyether-modified polysiloxane (tradename: QUARK (a mixture with an alkyl phenol ethoxylate); manufactured by Simplot), hydroxypropyl heptamethyltrisiloxane (tradename: SILGLOW (a mixture with ethoxylated acetate, polyethylene glycol monoallyl ether acetate and polyethylene glycol diacetate); manufactured by Britiz, tradename: SYL-TAC (a mixture of a mixture of ethylated rapeseed oil and methylated rapeseed oil, and polyoxyethylene octyl phenyl ether; manufactured by Wilbur-Ellis Holdings, Inc.), polyalkylene oxide-modified heptamethyltrisiloxane (tradename: SILWET L77); manufactured by Helena Chemical, tradename: SLIPPA (a mixture with a linear alcohol surfactant); manufactured by Interagro (UK) Ltd.), a polyether/polymethylsiloxane copolymer (tradename: SYL-COAT; manufactured by Wilbur-Ellis Holdings, Inc.), polyoxyethylene-modified polydimethylsiloxane (tradename: XIAMETER; manufactured by Dow), polyoxyalkylene oxypropylheptamethyltrisiloxane (tradename: BREAK-THRU (a mixture with polyoxyalkylene propenyl ether); manufactured by SANKEI CHEMICAL CO., Ltd.), a siloxane/polyalkylene oxide copolymer (tradename: VESTIS (a mixture with polyalkylene oxide; manufactured by Simplot).

Among them, preferred is polyether siloxane (tradename: BREAK-THRU OE441; manufactured by EVONIC), polyether trisiloxane (tradename: BREAK-THRU S240, BREAK-THRU S233; manufactured by Degussa), polyoxyethylene dimethylsiloxane (tradename: DYME-AMIC (a mixture with methylated seed oil); manufactured by Helena Chemical), polyalkylene oxide-modified polymethylsiloxane (tradename: KINETIC; manufactured by Helena Chemical), polyether-modified polysiloxane (tradename: QUARK (a mixture with a nonionic surfactant); manufactured by Simplot), hydroxypropyl heptamethyltrisiloxane (tradename: SILGLOW (a mixture with ethoxylated acetate, polyethylene glycol monoallyl ether acetate and polyethylene glycol diacetate); manufactured by Britiz), tradename: SYL-TAC (a mixture of a mixture of ethylated rapeseed oil and methylated rapeseed oil, and polyoxyethylene octyl phenyl ether; manufactured by Wilbur-Ellis Holdings, Inc.), polyalkylene oxide-modified heptamethyltrisiloxane (tradename: SILWET L77; manufactured by Helena Chemical), a polyether/polymethylsiloxane copolymer (tradename: SYL-COAT; manufactured by Wilbur-Ellis Holdings, Inc.) or a siloxane/polyalkylene oxide copolymer (tradename: VESTIS (a mixture with polyalkylene oxide); manufactured by Simplot).

The polyoxyethylene surfactant may, for example, be a polyoxyethylene alkyl phenyl ether, a polyoxyethylene fatty acid ester, formalin condensate of a polyoxyethylene alkyl phenyl ether, a polyoxyethylene alkyl ether, a polyoxyethylene aryl ether, polyoxyethylene (mono-, di- or tri-)phenyl phenyl ether, polyoxyethylene (mono-, di- or tri-)benzyl phenyl ether, polyoxypropylene (mono-, di- or tri-)benzyl phenyl ether, polyoxyethylene (mono-, di- or tri-)styryl phenyl ether, polyoxypropylene (mono-, di- or tri-)styryl phenyl ether, a polymer of polyoxyethylene (mono-, di- or tri-)styryl phenyl ether, a polyoxyethylene/polyoxypropylene block polymer, an alkylpolyoxyethylene/polyoxypropylene block polymer ether, an alkylphenylpolyoxyethylene/polyoxypropylene block polymer ether, a polyoxyethylene bisphenyl ether, a polyoxyethylene resinate, a polyoxyethylene fatty acid amide, an alkylphenoxy polyethoxy ethanol, polyoxyethylene nonylphenoxy ether, a polyoxyethylene alkylamine or a polyoxyethylene rosin ester.

Among them, preferred is a polyoxyethylene alkyl phenyl ether or a polyoxyethylene alkyl ether.

Further, the polyoxyethylene surfactant may be used as mixed with the above-described silicone surfactant or the after-mentioned polyhydric alcohol surfactant, sulfonate surfactant, paraffin, vegetable oil, etc. Among them, the silicone surfactant is preferably hydroxypropyl heptamethyltrisiloxane, polyether-modified polysiloxane, a siloxane/polyalkylene oxide copolymer or the like, the polyhydric alcohol surfactant is preferably a sorbitan fatty acid ester or the like, the sulfonate surfactant is preferably sodium dimethylbenzenesulfonate or the like, the paraffin is preferably paraffin oil or the like, and the vegetable oil is preferably tall oil, tall oil fatty acid, tall oil fatty acid ester, methylated rapeseed oil, ethylated rapeseed oil, methylated canola oil, glycerin or the like.

Specific examples of the polyoxyethylene alkyl phenyl ether include polyoxyethylene nonyl phenyl ether (tradename: ALSOAP 30; manufactured by Sumitomo Chemical Company, Limited, AGRAL 90; manufactured by Syngenta), a polyoxyethylene alkyl phenyl ether (tradename: ADWET90 (a mixture with diethylene glycol and tall oil fatty acid); manufactured by Simplot, tradename: PERSIST ULTRA (a mixture with methylated canola oil); manufactured by Simplot, tradename: AD-MAX 90 (a mixture with glycerin and sodium dimethylbenzenesulfonate); manufactured by Simplot, tradename: PRIME OIL (a mixture with tall oil and paraffin oil); manufactured by WINFIELD UNITED), polyoxyethylene nonyl phenoxy ether (tradename: AGRAL; manufactured by Syngenta), 4-nonylphenyl-polyethylene glycol (tradename: ARKOPAL N100; manufactured by Clariant), octylphenoxypolyethoxyethanol (tradename: CITOWETT; manufactured by BASF), polyoxyethylene nonyl phenol (tradename: R-11; manufactured by Wilbur-Ellis Holdings, Inc.), polyoxyethylene octyl phenyl ether (tradename: KUSARINO; manufactured by NIHON NOHYAKU CO., LTD.), tradename: SYL-TAC (a mixture of a mixture of ethylated rapeseed oil and methylated rapeseed oil, and hydroxypropyl heptamethyltrisiloxane); manufactured by Wilbur-Ellis Holdings Inc.), polyoxyethylene styryl phenyl ether (tradename: NOIGEN EA110; manufactured by DKS Co., Ltd.) and a polyoxyethylene alkyl phenyl ether (tradename: MIXPOWER (a mixture with a polyoxyethylene alkyl ether); manufactured by Syngenta).

Specific examples of the polyoxyethylene fatty acid ester include a lanolin fatty acid polyethylene glycol ester (tradename: RAMIGEN ES-70; manufactured by DKS Co., Ltd.), a polyoxyethylene C16-C18 fatty acid ester (tradename: EMULAN PS700; manufactured by BASF), a polyoxyethylene resinate (tradename: KK STICKER; manufactured by AGRO-KANESHO CO., LTD., SQUASH (a mixture with a sorbitan fatty acid ester); manufactured by KAO Corporation), and a polyoxyethylene fatty acid ester (tradename: NOIGEN ET-120E; manufactured by DKS Co., Ltd.).

Specific examples of the polyoxyethylene alkylamine include polyoxyethylene oleylamine (tradename: PIONIN D-3605; manufactured by TAKEMOTO OIL & FAT Co., Ltd.)

Specific examples of the polyoxyethylene alkyl ether include polyoxyethylene tridecyl ether (tradename: NOIGEN TDS-70; manufactured by DKS Co., Ltd.), an alkyl aryl polyoxyalkene ether (tradename: INDUCE; manufactured by Helena), N,N-Bis2-omega-hydroxypolyoxyethylene alkylamine (tradename: ENTRY (a mixture with tall oil fatty acid methyl ester); manufactured by Simplot).

Among them, preferred is a polyoxyethylene alkyl phenyl ether (tradename: ADWET90 (a mixture with diethylene glycol and tall oil fatty acid); manufactured by tradename: SIMPLOT, PERSIST ULTRA (a mixture with methylated canola oil); manufactured by Simplot, tradename: AD-MAX 90 (a mixture with glycerin and sodium dimethylbenzenesulfonate); manufactured by Simplot, tradename: PRIME OIL (a mixture with tall oil and paraffin oil); manufactured by WINFIELD UNITED), polyoxyethylene nonylphenol (tradename: R-11; manufactured by Wilbur-Ellis Holdings, Inc.), an alkyl aryl polyoxyalkene ether (tradename: INDUCE; manufactured by Helena), polyoxyethylene octyl phenyl ether (tradename: SYL-TAC (a mixture of a mixture of ethylated rapeseed oil and methylated rapeseed oil, and hydroxypropyl heptamethyltrisiloxane); manufactured by Wilbur-Ellis Holdings Inc.) or N,N-Bis2-omega-hydroxypolyoxyethylene alkylamine (tradename: ENTRY (a mixture with tall oil fatty acid methyl ester); manufactured by Simplot).

The polyhydric alcohol surfactant may, for example, be a polyoxyethylenehexitan fatty acid ester, a sorbitan fatty acid ester, a polyoxyethylene sorbitan fatty acid ester, a polyethylene glycol fatty acid ester or a polyhydric alcohol fatty acid ester, or an ethylene oxide adduct thereof, a sucrose fatty acid ester, a castor oil ethylene oxide adduct, a hydrogenated castor oil ethylene oxide adduct, an alkylamine ethylene oxide adduct or a fatty acid amide ethylene oxide adduct.

Among them, preferred is a sorbitan fatty acid ester or a polyhydric alcohol fatty acid ester or an ethylene oxide adduct thereof.

Further, the polyhydric alcohol surfactant may be used as mixed with the above-described polyoxyethylene surfactant or the after-mentioned anionic surfactant, paraffin or vegetable oil. Among them, the polyoxyethylene surfactant is preferably a polyoxyethylene resinate, a polyoxyethylene fatty acid ester or the like, the anionic surfactant is preferably a dialkyldimethylammonium polynaphthylmethanesulfonate or the like, the paraffin is preferably paraffin-based petroleum, and the vegetable oil is preferably methylated soybean oil or the like.

Specific examples of the polyhydric alcohol surfactant include a polyoxyethylenehexitan fatty acid ester (tradename: APROACH BI; manufactured by MARUWA BIO-CHEMICAL Co., Ltd.), a polyoxyethylene sorbitan fatty acid ester (tradename: TWEEN20; manufactured by Wako Pure Chemical Industries, Ltd.), a sorbitan fatty acid ester (tradename: DESTINY, tradename: DESTINY HC (a mixture with methylated soybean oil and high-fructose corn syrup, manufactured by Win Field United, tradename: SQUASH (a mixture with a polyoxyethylene resinate); manufactured by Kao Corporation, tradename: SORGEN40; manufactured by DKS Co., Ltd., tradename: BRAVO (a mixture with a polyoxyethylene fatty acid ester and a dialkyldimethylammonium polynaphthylmethanesulfonate) manufactured by AGRO-KANESHO CO., LTD.), a castor oil ethylene oxide adduct (tradename: D-230; manufactured by TAKEMOTO OIL & FAT Co., Ltd.), a hydrogenated castor oil ethylene oxide adduct (tradename: D-230KZ; manufactured by TAKEMOTO OIL & FAT Co., Ltd.), polyethylene glycol isotridecyl ester (tradename: GENAPOL X-80; manufactured by Clariant), polyethylene glycol monooleate (tradename: NIKKOL MYO-10V; manufactured by Nikko Chemicals, Co., Ltd.), polyethylene glycol monostearate (tradename: NIKKOL MYS-55V; manufactured by Nikko Chemicals, Co., Ltd.), and a mixture of a polyhydric alcohol fatty acid ester and a polyhydric alcohol polyethylene oxide fatty acid ester (tradename: AGRIDEX (a mixture with paraffin-based petroleum); manufactured by Bayer).

Among them, preferred is a sorbitan fatty acid ester (tradename: DESTINY, tradename: DESTINY HC (a mixture with methylated soybean oil and high-fructose corn syrup, manufactured by WinField United) or a mixture of a polyhydric alcohol fatty acid ester and a polyhydric alcohol polyethylene oxide fatty acid ester (tradename: AGRIDEX (a mixture with paraffin-based petroleum); manufactured by Bayer).

The alkanolamide surfactant may, for example, be ethanolamine, triethanolamine, an alkylalkanolamide, or a mixture thereof.

Among them, preferred is ethanolamine, triethanolamine or a mixture thereof.

Further, the alkanolamide surfactant may be used as mixed with the above-described polyoxyethylene surfactant or the after-mentioned sulfate surfactant. Among them, the polyoxyethylene surfactant is preferably propylene glycol or the like, and the sulfate surfactant is preferably a polyoxyethylene alkyl aryl sulfate or the like.

Specific examples of the alkanolamide surfactant include an alkanolamine surfactant (a mixture of ethanolamine and triethanolamine) (tradename: COHERE (a mixture with a polyoxyethylene alkyl aryl sulfate and propylene glycol); manufactured by Helena) and an alkylalkanolamide (tradename: AMINON PK-02S; manufactured by Kao Corporation).

Among them, preferred is an alkanolamine surfactant (a mixture of ethanolamine and triethanolamine) (tradename: COHERE (a mixture with a polyoxyethylene alkyl aryl sulfate and propylene glycol); manufactured by Helena).

The anionic surfactant (b) may, for example, be a sulfonate surfactant, a sulfate surfactant or a phosphate surfactant, and is preferably a phosphate surfactant.

The sulfonate surfactant may, for example, be a dialkylsulfosuccinate, a dialkylsulfosuccinic acid, an alkylbenzenesulfonate, an α-olefinsulfonic acid, a polyoxyethylene alkyl phenyl ether sulfonate, a polyoxyethylene alkyl ether sulfosuccinic acid half ester, naphthalene sulfonic acid or an alkylnaphthalenesulfonic acid, dodecylbenzenesulfonic acid diethanolamine, a polyoxyethylene alkyl aryl sulfonate or a dialkyldimethylammonium polynaphthylmethanesulfonate, or a salt thereof.

Specific examples of the sulfonate surfactant include a dialkylsulfosuccinate (tradename: NEW KALGEN EP-70G; manufactured by TAKEMOTO OIL & FAT Co., Ltd., tradename: NEW KALGEN EX-70; manufactured by TAKEMOTO OIL & FAT Co., Ltd.).

The sulfate ester surfactant may, for example, be a higher alcohol sulfuric acid ester salt; an alkyl sulfate; a polyoxyethylene alkyl ether sulfate; a polyoxyethylene alkyl aryl sulfate; a polyoxyethylene alkylphenyl ether sulfate; a sulfuric acid ester of a polymer of a polyoxyethylene alkylphenyl ether; a polyoxyethylene benzyl phenyl ether sulfate; a polyoxyethylene styryl phenyl ether sulfate; a sulfuric acid ester of a polymer of a polyoxyethylene styryl phenyl ether; a sulfuric acid ester of a polyoxyethylene polyoxypropylene block polymer or a sulfonated olefin, or a salt thereof.

Among them, preferred is a polyoxyethylene alkyl aryl sulfate.

Further, the sulfate surfactant may be used as mixed with the above-described polyoxyethylene surfactant, alkanol surfactant or the like. Among them, the alkanolamide surfactant may, for example, be ethanolamine or triethanolamine.

Specific examples of the sulfate surfactant include a polyoxyethylene alkyl aryl sulfate (tradename: COHERE (a mixture of an alkanolamide surfactant (a mixture of ethanolamine and triethanolamine) and propylene glycol); manufactured by Helena), sodium lauryl sulfate (tradename: MONOGEN Y-100; manufactured by DKS Co., Ltd.) and an alkyl sulfate (tradename: TRADER PRO (a mixture with magnesium sulfate); manufactured by Comtorir Commercial Des Lubrifiants).

Among them, preferred is a polyoxyethylene alkyl aryl sulfate (tradename: COHERE (a mixture of an alkanolamide surfactant (a mixture of ethanolamine and triethanolamine) and propylene glycol); manufactured by Helena).

The phosphate surfactant may, for example, be a polyoxyethylene alkyl ether phosphate; a polyoxyethylene alkyl phenyl ether phosphate; a phosphoric acid ester of a polymer of a polyoxyethylene alkyl phenyl ether; a polyoxyethylene benzyl phenyl ether phosphate; a polyoxyethylene styryl phenyl ether phosphate; a phosphoric acid ester of a polymer of a polyoxyethylene styryl phenyl ether or a phosphoric acid ester of a polyoxyethylene polyoxypropylene block polymer, or a salt of such a phosphate.

Among them, preferred is a polyoxyethylene alkyl ether phosphate.

Specific examples of the phosphate surfactant include a polyoxyethylene C12-C15 alkyl ether phosphate (tradename: PHOSPHOLAN PS-222; manufactured by AkzoNobel), polyoxyethylene lauryl ether diphosphate (tradename: PHOSPHANOL ML-220; manufactured by TOHO CHEMICAL INDUSTRY Co., Ltd.), polyoxyethylene lauryl ether tetraphosphate (tradename: PHOSPHANOL RD-510Y; manufactured by TOHO CHEMICAL INDUSTRY Co., Ltd.), polyoxyethylene tridecyl ether phosphate (tradename: PLYSURF A212C; manufactured by DKS Co., Ltd.).

Among them, preferred is polyoxyethylene tridecyl ether phosphate (tradename: PLYSURF A212C; manufactured by DKS Co., Ltd.).

Further, in the present invention, a mixture of the nonionic surfactant and the anionic surfactant may also be used. Specific examples of the surfactant according to such an embodiment include a mixture of polyoxyethylene nonyl phenyl ether, a polyoxyethylene fatty acid ester and sodium polynaphthylmethanesulfonate (tradename: GRAMIN S; manufactured by Sankyo Chemicals Agro, Inc.).

The cationic surfactant may, for example, be an ethoxylated aliphatic amine surfactant, a dialkylammonium salt surfactant or an alkylammonium salt surfactant.

The ethoxylated aliphatic amine surfactant may, for example, be ethoxylated fatty amine; tallow alkylamine ethoxylate; or tallow amine ethoxylate.

Specific examples of the ethoxylated aliphatic amine surfactant include an ethoxylated fatty amine (tradename: ETHYLAN TT-15; manufactured by Akcros chemicals), tallow alkylamine ethoxylate (tradename: GENAMIN T-150; manufactured by Clariant), and tallow amine ethoxylate (tradename: GENAMIN T-200; manufactured by Clariant, tradename: ETHOMEEN T/25; manufactured by AkzoNobel).

The dialkylammoium salt surfactant may, for example, be a dialkyldimethylammonium polynaphthylmethanesulfonate; or lauryl trimethylammonium chloride.

Specific examples of the dialkylammonium salt surfactant include a dialkyldimethylammonium polynaphthylmethanesulfonate (tradename: NEEDS (a mixture with a polyoxyethylene fatty acid ester); manufactured by Kao Corporation) and lauryl trimethylammonium chloride (tradename: CATIOGEN TML; manufactured by DKS Co., Ltd.).

Among them, preferred is lauryl trimethylammonium chloride (tradename: CATIOGEN TML; manufactured by DKS Co., Ltd.).

The vegetable oil may, for example, be tall oil, coconut oil, soybean oil, rapeseed oil, corn oil, linseed oil, sunflower oil, cottonseed oil, esterated rapeseed oil, olive oil, castor oil, palm oil, avocado oil, canola oil, tall oil fatty acid or tall oil fatty acid methyl ester. Further, the vegetable oil includes extracts (e.g. glycerin and fatty acid) from vegetable oils, alkylated vegetable oil (e.g. methylated soybean oil, methylated rapeseed oil, methylated seed oil, ethylated rapeseed oil and methylated canola oil).

Among them, preferred is tall oil, tall oil fatty acid, tall oil fatty acid methyl ester, methylated soybean oil, methylated seed oil, methylated rapeseed oil and ethylated rapeseed oil).

Further, the vegetable oil may be used as mixed with the above-described silicone surfactant, polyoxyethylene surfactant or polyhydric alcohol surfactant or the after-mentioned paraffin. Among them, the silicone surfactant may be polyoxyethylene dimethylsiloxane or hydroxypropyl heptamethyltrisiloxane, the polyoxyethylene surfactant may be a polyoxyethylene alkyl phenyl ether, N,N-bis2-omega-hydroxypolyoxyethylene alkylamine or polyoxyethylene octyl phenyl ether, and the polyhydric alcohol surfactant may be a sorbitan fatty acid ester.

Specific examples of the vegetable oil include tall oil (tradename: PRIME OIL (a mixture with a polyoxyethylene alkyl phenyl ether and paraffin oil), manufactured by WinField United), tall oil fatty acid (tradename: ADWET90 (a mixture with a polyoxyethylene alkyl phenyl ether and diethylene glycol), manufactured by Simplot), tall oil fatty acid methyl ester (tradename: ENTRY (a mixture with N,N-Bis2-omega-hydroxypolyoxyethylene alkylamine), manufactured by Simplot), methylated rapeseed oil (tradename: TIPO, manufactured by Belchim), purified soybean oil (tradename: Soy Oil Spray, manufactured by UNITED SUPPLIERS), methylated soybean oil (tradename: DESTINY, tradename: DESTINY HC (a mixture with a sorbitan fatty acid ester and high-fructose corn syrup, manufactured by WinField United), methylated seed oil (tradename: DYNE-AMIC (a mixture with polyoxyethylene dimethylsiloxane), manufactured by Helena Chemical), a mixture of ethylated rapeseed oil and methylated rapeseed oil (tradename: SYL-TAC (a mixture with polyoxyethylene octyl phenyl ether and hydroxypropyl heptamethyltrisiloxane), manufactured by Wilbur-Ellis Holdings Inc.), and methylated canola oil (tradename: PERSIST-ULTRA (a mixture with a polyoxyethylene alkyl phenyl ether), manufactured by Simplot).

Among them, preferred is tall oil (tradename: PRIME OIL (a mixture with a polyoxyethylene alkyl phenyl ether and paraffin oil); manufactured by WinField United), tall oil fatty acid (tradename: ADWET90 (a mixture with a polyoxyethylene alkyl phenyl ether and diethylene glycol); manufactured by Simplot), tall oil fatty acid methyl ester (tradename: ENTRY (a mixture with N,N-Bis2-omega-hydroxypolyoxyethylene alkylamine); manufactured by Simplot), methylated soybean oil (tradename: DESTINY, tradename: DESTINY HC (a mixture with a sorbitan fatty acid ester and high-fructose corn syrup; manufactured by WinField United), methylated seed oil (tradename: DYNE-AMIC (a mixture with polyoxyethylene dimethylsiloxane); manufactured by Helena Chemical), a mixture of ethylated rapeseed oil and methylated rapeseed oil (tradename: SYL-TAC (a mixture with polyoxyethylene octyl phenyl ether and hydroxypropyl heptamethyltrisiloxane); manufactured by Wilbur-Ellis Holdings Inc.) or methylated canola oil (tradename: PERSIST ULTRA (a mixture with a polyoxyethylene alkyl phenyl ether); manufactured by Simplot).

The paraffin (b) may, for example, be paraffin, petroleum, mineral oil, paraffin-based petroleum, paraffin-based mineral oil, paraffin oil, machine oil, spindle oil, naphtha, liquid paraffin or kerosene.

Among them, preferred is paraffin-based petroleum, paraffin-based mineral oil or paraffin oil.

Specific examples of the paraffin include paraffin-based petroleum (tradename: AGRIDEX (a mixture with a polyhydric alcohol fatty acid ester and a polyhydric alcohol polyethylene oxide fatty acid ester; manufactured by Bayer), paraffin-based mineral oil (tradename: ASSIST (a mixture with a surfactant); manufactured by BASF), paraffin oil (tradename: PRIME OIL (a mixture with a polyoxyethylene alkyl phenyl ether and tall oil); manufactured by WINFIELD UNITED), paraffin (tradename: PETAN V; manufactured by AGRO-KANESHO CO., LTD) and machine oil (tradename: RABISAN-SPRAY; manufactured by Nippon Soda Co., Ltd.).

Among them, preferred is paraffin-based petroleum (tradename: AGRIDEX (a mixture with a polyhydric alcohol fatty acid ester and a polyhydric alcohol polyethylene oxide fatty acid ester; manufactured by Bayer), paraffin-based mineral oil (tradename: ASSIST (a mixture with a surfactant); manufactured by BASF) or paraffin oil (tradename: PRIME OIL (a mixture with a polyoxyethylene alkyl phenyl ether and tall oil); manufactured by WINFIELD UNITED).

Further, in the present invention, a mixture of a nonionic surfactant and a paraffin may also be used. Specific examples of such an embodiment include a mixture of paraffin-based petroleum, a polyhydric alcohol fatty acid ester and a polyhydric alcohol polyethylene oxide fatty acid ester (tradename: AGRIDEX; manufactured by Bayer).

The resin (b) may, for example, be an alkyd resin, a vinyl acetate resin, or an acrylic resin.

Among them, preferred is an alkyd resin.

Specific examples of the resin include a phthalic acid-modified glycerol alkyd resin (tradename: LATRON B-1956; manufactured by Simplot), a vinyl acetate resin emulsion (tradename: VINYBRAN 1035F6; manufactured by Nissin Chemical Industry Co., Ltd.) and an acrylic resin (tradename: VINYBRAN ADH7102; manufactured by Nissin Chemical Industry Co., Ltd.).

Among them, preferred is a phthalic acid-modified glycerol alkyd resin (tradename: LATRON B-1956; manufactured by Simplot).

The terpene (b) may, for example, be α-pinene, β-pinene, β-pinene polymer, a pinene (diterpene) polymer, a pinene (polyterpene) polymer, di-1-menthene or limonene.

Among them, preferred is β-pinene polymer, a pinene (diterpene) polymer or a pinene (polyterpene) polymer.

Specific examples of the terpene include a β-pinene polymer (tradename: SURFIX, manufactured by Helena), a pinene (diterpene) polymer (tradename: NU FILM 17 (a mixture with a hydrocarbon resin and a petrolactum polyalkyloxy compound), manufactured by Miller), a pinene (polyterpene) polymer (tradename: NU FILM P (a mixture with a polyalkyloxy compound), manufactured by Miller), and di-1-menthene (tradename: LASTICK, manufactured by Helena).

Among them, preferred is β-pinene polymer (tradename: SURFIX, manufactured by Helena), a pinene (diterpene) polymer (tradename: NU FILM 17 (a mixture with a hydrocarbon resin and a petrolactum polyalkyloxy compound), manufactured by Miller) and a pinene (polyterpene) polymer (tradename: NU FILM P (a mixture with a polyalkyloxy compound); manufactured by Miller).

The component (b) is preferably selected from the group consisting of a nonionic surfactant, an anionic surfactant, a cationic surfactant, a vegetable oil, a paraffin, a resin and a terpene, and specific examples thereof include a silicone surfactant, a polyoxyethylene surfactant, a polyhydric alcohol surfactant, an alkanolamide surfactant, a sulfate surfactant, a phosphate surfactant, an ethoxylated aliphatic amine surfactant, a vegetable oil, a paraffin, an alkyd resin and a terpene.

Among them, more preferred is a nonionic surfactant, a vegetable oil and a paraffin.

Specific examples of a preferred component (b) include at least one member selected from the group consisting of polyether siloxane, polyether trisiloxane, polyoxyethylene dimethylsiloxane, hydroxypropyl heptamethyltrisiloxane, polyalkylene oxide-modified polymethylsiloxane, polyalkylene oxide-modified heptamethylsiloxane, polyether-modified polysiloxane, a polyether/polymethylsiloxane copolymer, a siloxane/polyalkylene oxide copolymer, polyoxyethylene alkyl phenyl ether, polyoxyethylene alkyl ether, a sorbitan fatty acid ester, a polyhydric alcohol fatty acid ester, a polyhydric alcohol polyethylene oxide fatty acid ester, ethanolamine, triethanolamine, N,N-Bis2-omega-hydroxypolyoxyethylene alkylamine, a polyoxyethylene alkyl aryl sulfate, a polyoxyethylene alkyl ether phosphate, lauryl trimethylammonium chloride, tall oil, tall oil fatty acid, tall oil fatty acid methyl ester, methylated soybean oil, methylated rapeseed oil, ethylated rapeseed oil, methylated seed oil, methylated canola oil, paraffin-based petroleum, paraffin-based mineral oil, paraffin oil, a phthalic acid-modified glycerol alkyd resin, a β-pinene polymer, a pinene (diterpene) polymer and a pinene (polyterpene) polymer, and specific examples of a more preferred component (b) include at least one member selected from the group consisting of a polyhydric alcohol fatty acid ester, a polyhydric alcohol polyethylene oxide fatty acid ester, ethanolamine, triethanolamine, a polyoxyethylene alkyl aryl sulfate, a polyether trisiloxane, polyoxyethylene dimethylsiloxane, polyalkylene oxide-modified polymethylsiloxane, hydroxypropyl heptamethyltrisiloxane, polyalkylene oxide-modified heptamethyltrisiloxane, a polyether/polymethylsiloxane copolymer, polyoxyethylene alkyl phenyl ether, polyoxyethylene nonyl phenol, a siloxane/polyalkylene oxide copolymer, an alkyl aryl polyoxyalkene ether, a sorbitan fatty acid ester, tall oil, methylated soybean oil, methylated seed oil, methylated canola oil, paraffin-based petroleum, paraffin-based mineral oil and paraffin oil.

The enhancing method of the present invention is effective for controlling various plant disease, for example, diseases of Gramineae crops, such as rice diseases such as blast caused by *Magnaporthe grisea*, brown spot caused by *Cochliobolus miyabeanus*, and sheath blight caused by *Rhizoctonia solani*; wheat and barley diseases such as wheat and barley powdery mildew caused by *Erysiphe graminis*, *Fusarium* blight caused by *Fusarium* spp., rust caused by *Puccinia* spp., browning root rot caused by *Pythium* spp., loose smut caused by *Ustilacio nuda*, eye spot caused by *Pseudocercosporella herpotrichoides*, and speckled leaf blotch or glume blotch caused by *Septoria* spp.; corn diseases such as leaf spot caused by *Phaeosphaeria* spp., rust caused by *Puccinia* spp., northern leaf blight caused by *Setosphaeria* spp., southern leaf blight caused by *Cochliobolus heterostrophus*, root rot caused by *Pythium graminicola*, and smut caused by *Ustilago maydis*; and sugar cane diseases such as smut caused by *Ustilacio scitaminea*, leaf scorch caused by *Stacionospora* spp., rust caused by *Puccinia* spp., top rot caused by *Gibberella* spp., sooty mold caused by *Caldariomyces* spp., and leaf blight caused by *Pseudocercospora* spp.;

diseases of Leguminosae crops, such as powdery mildew caused by *Oidium* spp., rust caused by *Phakopsora* spp., downy mildew caused by *Peronospora* spp., *Phytophthora* rot caused by *Phytophthora* spp., anthracnose caused by *Colletotrichum* spp., sclerotinia rot caused by *Sclerotinia* spp., and gray mold caused by *Botrytis* spp.;

diseases of Brassicaceae crops, such as downy mildew caused by *Peronospora* spp., and *Alternaria* leaf spot caused by *Alternaria* spp.;

diseases of Asteraceae crops, such as downy mildew caused by *Bremia* spp., blight caused by *Phytophthora* spp., gray mold caused by *Botrytis* spp., stem rot caused by *Sclerotinia* spp., and rust caused by *Aecidium;* diseases of Solanaceae crops, such as tomato diseases such as early blight caused by *Alternaria solani*, leaf mold caused by *Fulvia fulva*, late blight caused by *Phytophthora infestans*, gray mold caused by *Botrytis cinerea*, and powdery mildew caused by *Oidiopsis sicula*; and potato diseases such as early blight caused by *Alternaria solani*, late blight caused by *Phytophthora infestans*, and Sclerotial rot caused by *Sclerotinia sclerotiorum;* diseases of Cucurbitaceae crops, such as anthracnose caused by *Colletotrichum lagenarium*, powdery mildew caused by *Sphaerotheca* spp., gummy stem blight caused by *Didymella bryoniae*, downy mildew caused by *Pseudoperonospora cubensis, phytophthora* rot caused by *Phytophthora* spp., and *Corynespora* leaf spot caused by *Corynespora cassiicola;* diseases of Allioideae crops, such as downy mildew caused by *Peronospora* spp., *Phytophthora* rot caused by *Phytophthora nicotianae*, gray mold caused by *Botrytis cinerea*, neck rot caused by *Sclerotinia* spp., and rust caused by *Puccinia* spp.;

diseases of Umbelliferae crops, such as leaf blight or *Alternaria* black rot caused by *Alternaria* spp., gray mold caused by *Botrytis cinerea, Sclerotinia* rot caused by *Sclerotinia* spp., powdery mildew caused by *Erysiphe heraclei*, and leaf spot caused by *Cercospora* spp.;

diseases of Liliaceae crops, such as *Botrytis* blight caused by *Botrytis* spp., blight caused by *Phytophthora* spp., and leaf blight caused by *Phomopsis* spp.;

diseases of Polygonaceae crops, such as downy mildew caused by *Peronospora* spp., powdery mildew caused by *Erysiphe polygoni*, and damping-off caused by *Rhizoctonia solani;* diseases of Convolvulaceae crops, such as wilt caused by *Fusarium oxysporum*, black rot caused by *Ceratocystis fimbriata*, and soil rot caused by *Streptomyces ipomoeae;* diseases of Chenopodiaceae crops, such as downy mildew caused by *Peronospora* spp., *Phytophthora* rot caused by *Phytophthora* spp., gray mold caused by *Botrytis cinerea*, root rot caused by *Sclerotinia sclerotiorum*, powdery mildew caused by *Oidium* spp., and *Cercospora* leaf spot caused by *Cercospora beticola*;

diseases of Vitaceae crops, such as bird's eye rot caused by *Elsinoe ampelina*, ripe rot caused by *Colletotrichum* spp., powdery mildew caused by *Erysiphe necator*, downy mildew caused by *Plasmopara viticola*, gray mold caused by *Botrytis cinerea, Cercospora* leaf spot caused by *Pseudocercospora* spp., and swelling arm caused by *Diaporthe kyushuensis*;

diseases of Rosaceae crops, such as strawberry diseases such as powdery mildew caused by *Sphaerotheca aphanis*, gray mold caused by *Botrytis cinerea*, and crown rot caused by *Glomerella cindulata*; apple diseases such as *Monilia* leaf blight caused by *Monilinia mali*, powdery mildew caused by *Podosphaera leucotricha, Alternaria* leaf spot caused by *Alternaria mali*, scab caused by *Venturia inaequalis*, bitter rot caused by *Glomerella cindulata*, blotch caused by *Diplocarpon mali*, ring rot caused by *Botryosphaeria kuwatsukai*, fly speck caused by *Zygophiala lamaicensis*, sooty blotch caused by *Gloeodes pomigena*, and fruit spot caused by *Mycosphaerella pomi*; Asian pear diseases such as scab caused by *Venturia* spp., black spot caused by *Alternaria* spp., powdery mildew caused by *Phyllactinia* spp., and *Phytophthora* crown and root rot caused by *Phytophthora cactorum*; and peach diseases such as brown rot caused by *Monilinia fructicola*, scab caused by *Cladosporium carpophilum*, and *Phomopsis* rot caused by *Phomopsis* spp.;

diseases of Rutaceae crops, such as melanoses caused by *Diaporthe citri*, and spot anthracnose caused by *Elsinoe fawcettii*;

diseases of Ebenaceae crops, such as anthracnose caused by *Colletotrichum gloeosporioides*, angular leaf spot caused by *Cercospora kaki*, powdery mildew caused by *Phyllactinia kakicola*, and fly speck caused by *Zyqophiala lamaicensis*; and diseases of Theaceae crops, such as Anthracnose caused by *Colletotrichum* spp., gray blight caused by *Pestalotiopsis longiseta*, bacterial shoot blight caused by *Pseudomonas syringae*, and leaf and stem gall caused by *Exobasidium camelliae*.

With a view to obtaining sufficient curative effects, penetration effects, etc., the present invention is effective for controlling the above plant disease, preferably powdery mildew, more preferably endoparasitic powdery mildew, particularly preferably powdery mildew caused by *Sphaerotheca* spp., *Oidium* spp. or *Phyllactinia* spp.

The present invention is effective also for controlling various seed borne disease, for example, diseases of Gramineae crops, such as wheat diseases such as *Fusarium* blight caused by *Fusarium* spp., anthracnose caused by *Colletotrichum graminicola*, stinking smut caused by *Tilletia* spp., loose smut caused by *Ustilago* spp., *Cephalosporium* stripe caused by *Cephalosporium gramineum*, and glume blotch caused by *Septoria nodorum*; corn diseases such as southern leaf blight caused by *Bipolaris maydis*, anthracnose caused by *Colletotrichum graminicola*, and seedling blight caused by *Fusarium avenaceum*; and sugar cane diseases such as red rot caused by *Glomerella tucumanensis*, pineapple disease caused by *Ceratocystis paradoxa*, and downy mildew caused by *Sclerospora sacchari*;

diseases of Leguminosae crops, such as soybean diseases such as purple stain caused by *Cercospora kikuchii*, downy mildew caused by *Peronospora manshurica, Fusarium* blight caused by *Fusarium oxysporum, Septoria* brown spot caused by *Septoria glycines*, pod and stem blight caused by *Diaporthe phaseolorum*, anthracnose caused by *Colletotrichum truncatum*, and sleeping-blight caused by *Septogloeum sojae*;

diseases of Brassicaceae crops, such as cabbage diseases such as *Alternaria* leaf spot caused by *Alternaria brassicae*, alternaria sooty spot caused by *Alternaria brassicicola*, downy mildew caused by *Peronospora parasitica*, bacterial leaf spot caused by *Pseudomonas cannabina*, black rot caused by *Xanthomonas campestris*, and black leg caused by *Phoma lingam*; Japanese radish diseases such as alternaria leaf spot caused by *Alternaria brassicae*, yellows caused by *Fusarium oxysporum*, and black rot caused by *Xanthomonas campestris*; and Chinese cabbage diseases such as alternaria leaf spot caused by *Alternaria brassicae*, black rot caused by *Xanthomonas campestris*, and yellows caused by *Verticillium dahliae*;

diseases of Solanaceae crops, such as tomato diseases such as early blight caused by *Alternaria solani*, bacterial canker caused by *Clavibacter michidanensis*, and bacterial spot caused by *Xanthomonas vesicatoria*; eggplant diseases such as early blight caused by *Alternaria solani*, and brown spot caused by *Phomopsis vexans*; and potato diseases such as scab caused by *Streptomyces* spp., silver scurf caused by *Helminthosporium solani*, and powdery scab caused by *Spongospora subterranea*;

diseases of Cucurbitaceae crops, such as cucumber diseases such as leaf blight caused by *Alternaria alternata*, bacterial spot caused by *Pseudomonas syringae*, and bacterial brown spot caused by *Xanthomonas cucurbitae*;

diseases of Allioideae crops, such as onion diseases such as *Alternaria* leaf spot caused by *Alternaria porri*, gray mold neck rot or Mycelial neck rot caused by *Botrytis* spp., *Fusarium* basal rot caused by *Fusarium oxysporum*, and downy mildew caused by *Peronospora* destructor;

diseases of Umbelliferae crops, such as carrot diseases such as leaf blight or *Alternaria* black rot caused by *Alternaria* spp., and bacterial blight caused by *Xanthomonas hortorum*; and celery diseases such as late blight caused by *Septoria apiicola*, stem rot caused by *Sclerotinia sclerotiorum*, and bacterial leaf blight caused by *Pseudomonas syringae*; and diseases of Chenopodiaceae crops, such as spinach diseases such as downy mildew caused by *Peronospora farinosa, Fusarium* wilt caused by *Fusarium oxysporum*, and anthracnose caused by *Colletotrichum spinaciae*.

The present invention is effective also for controlling soil diseases caused by phytopathogenic fungi such as *Fusarium* spp., *Pythium* spp., *Rhizoctonia* spp., *Verticillium* spp., *Plasmodiophora* spp., and *Thielaviopsis* spp.

The plants to be protected from various phytopathogenic fungi by the present invention are not particularly limited so long as they are agriculturally useful. They may, for example, be Gramineae crops (such as rice, wheat, barley, oat, rye, corn and sugar cane), Leuminosae crops (such as soybean, kidney bean and adzuki bean), Brassicaceae crops (such as cabbage, Chinese cabbage, Japanese radish, turnip, broccoli, cauliflower, Turnip rape and rape), Asteraceae crops (such as lettuce, burdock and crown daisy), Solanaceae crops (such as potato, eggplant, tomato, sweet pepper and tobacco), Cucurbitaceae crops (such as cucumber, pumpkin, melon and watermelon), Allioideae crops (such as Welsh onion, Chinese chive, *Allium chinense* and garlic), Umbelliferae crops (such as celery, carrot and parsley), Liliaceae crops (such as lily, tulip and asparagus), Polygonaceae crops (such as buckwheat), Convolvulaceae crops (such as sweet potato), Chenopodiaceae crops (such as spinach and sugar beet), Vitaceae crops (such as grape), Rosaceae crops (such as rose, strawberry, apple, pear, peach, loquat and almond), Rutaceae crops (such as mandarin orange, lemon and orange), Ebenaceae crops (such as Japanese persimmon), Theaceae crops (such as tea), Oleaceae crops (such as olive and jasmine), Malvaceae crops (such as cotton, cacao and okra), Musaceae crops (such as banana), Zingiberaceae crops (such as ginger), Rubiaceae crops (such as coffee plant), and Bromeliaceae crops (such as pineapple and *ananas*). Among them, preferred are Solanaceae crops or Cucurbitaceae crops, and more preferred is cucumber or sweet pepper.

So long as the purpose of the present invention can be accomplished, the component (a) and the component (b) of the present invention may be used as they are, or, one of them may be added to the other. Further, in the same manner as conventional agricultural chemicals, they may be mixed with various adjuvants and formulated into various formulations commonly used in this field such as a dust, granules, water dispersible granules, a wettable powder, a water-based suspension concentrate, an oil-based suspension concentrate, water soluble granules, an emulsifiable concentrate, a soluble concentrate, a paste, an aerosol and an ultra low-volume formulation.

When such a formulation is prepared, the component (a) and the component (b) of the present invention may be mixed and formulated together, or may be individually formulated.

Such adjuvants include solid carriers such as diatomaceous earth, slaked lime, calcium carbonate, talc, white carbon, kaoline, bentonite, a mixture of kaolinite and sericite, clay, sodium carbonate, sodium bicarbonate, mirabilite, zeolite and starch; and solvents such as water, toluene, xylene, solvent naphtha, dioxane, acetone, isophorone, methyl isobutyl ketone, chlorobenzene, cyclohexane, dimethyl sulfoxide, dimethylformamide, dimethylacetamide, N-methyl-2-pyrrolidone and alcohol. Such adjuvants may be selected from those known in this field so long as the purpose of the present invention can thereby be accomplished. Further, various additives which are commonly used, such as a filler, a thickener, an anti-settling agent, an anti-freezing agent, a dispersion stabilizer, a phytotoxicity reducing agent, and an anti-mold agent, may also be employed. The blend ratio of the total amount of the component (a) and the component (b) of the present invention to the various adjuvants is usually from 0.005:99.995 to 95:5, preferably from 0.2:99.8 to 90:10 by the weight ratio. In the actual application of such a formulation, it may be used as it is, or may be diluted to a predetermined concentration with a diluent such as water, and various spreaders may be added thereto, as the case requires.

Further, in the present invention, other agricultural chemicals such as a fungicide, an insecticide, a miticide, a nematicide, a soil insect pesticide, an antivirus agent, an attractant, a herbicide, a plant growth regulating agent and a microbial chemical, may be used in combination, whereby more excellent effects may sometimes be obtained.

The active ingredient compounds of a fungicide in the above-mentioned other agricultural chemicals may properly be selected, for example, from the following group of compounds (by common names or test codes of Japan Plant Protection Association). In a case where these compounds have their salts, alkyl esters, various structural isomers such as optical isomers, etc., all of them are included, even if no specific disclosure thereof is made.

Anilinopyrimidine compounds such as mepanipyrim, pyrimethanil and cyprodinil;

pyridinamine compounds such as fluazinam;

triazolopyrimidine compounds such as 5-chloro-7-(4-methylpiperidin-1-yl)-6-(2,4,6-trifluorophenyl)[1,2,4]triazolo[1,5-a]pyrimidine;

azole compounds such as triadimefon, bitertanol, triflumizole, etaconazole, propiconazole, penconazole, flusilazole, myclobutanil, cyproconazole, tebuconazole, hexaconazole, furconazole-cis, prochloraz, metconazole, epoxiconazole, tetraconazole, oxpoconazole fumarate, prothioconazole, triadimenol, flutriafol, difenoconazole, fluquinconazole, fenbuconazole, bromuconazole, diniconazole, tricyclazole, probenazole, simeconazole, pefurazoate, ipconazole, imibenconazole, azaconazole, triticonazole, imazalil, ipfentrifluconazole and mefentrifluconazole;

quinoxaline compounds such as quinomethionate;

dithiocarbamate compounds such as maneb, zineb, mancozeb, polycarbamate, metiram, propineb and thiram;

organic chlorine compounds such as fthalide, chlorothalonil and quintozene;

imidazole compounds such as benomyl, carbendazim, thiabendazole and fuberiazole;

cyanoacetamide compounds such as cymoxanil;

anilide compounds such as metalaxyl, metalaxyl-M (another name: mefenoxam), oxadixyl, ofurace, benalaxyl, benalaxyl-M (another name: kiralaxyl, chiralaxyl), furalaxyl, cyprofuram, carboxin, oxycarboxin, thifluzamide, boscalid, bixafen, isotianil, tiadinil, sedaxane and pyraziflumid;

sulfamide compounds such as dichlofluanid;

copper compounds such as cupric hydroxide, oxine copper, anhydrous copper sulfate, copper nonylphenolsulfonate, copper 8-hydroxyquinoline and dodecylbenzenesulfonic acid bisethylenediamine copper(II) salt (another name: DBEDC);

organophosphorus compounds such as fosetyl-aluminum, tolclofos-methyl, edifenphos and iprobenfos;

phthalimide compounds such as captan, captafol and folpet;

dicarboxyimide compounds such as procymidone, iprodione and vinclozolin;

benzanilide compounds such as flutolanil, mepronil and benodanil;

amide compounds such as penthiopyrad, penflufen, furametpyr, isopyrazam, silthiopham, fenoxanil, fenfuram, fluxapyroxad, benzovindiflupyr and pydiflumetofen;

benzamide compounds such as fluopyram and zoxamide;

thiophenamide compounds such as isofetamid;

piperazine compounds such as triforine;

pyridine compounds such as pyrifenox and pyrisoxazole;

carbinol compounds such as fenarimol and nuarimol;

piperidine compounds such as fenpropidin;

morpholine compounds such as fenpropimorph and tridemorph;

organotin compounds such as fentin hydroxide and fentin acetate;

urea compounds such as pencycuron;

carboxylic acid amide compounds such as dimethomorph, flumorph, pyrimorph, iprovalicarb, benthiavalicarb-isopropyl, valifenalate and mandipropamid;

phenyl carbamate compounds such as diethofencarb;

cyanopyrrole compounds such as fludioxonil and fenpiclonil;

strobilurin compounds such as azoxystrobin, kresoxim-methyl, metominostrobin, trifloxystrobin, picoxystrobin, oryzastrobin, dimoxystrobin, pyraclostrobin, fluoxastrobin, enestroburin, pyraoxystrobin, pyrametostrobin, coumoxystrobin, enoxastrobin, fenaminstrobin, flufenoxystrobin, triclopyricarb and mandestrobin;

oxazolidinone compounds such as famoxadone;
thiazolecarboxamide compounds such as ethaboxam;
imidazolinone compounds such as fenamidone;
hydroxyanilide compounds such as fenhexamid;
sulfonamide compounds such as flusulfamide, amisulbrom and cyazofamid;
oxime ether compounds such as cyflufenamid;
anthraquinone compounds such as dithianon;
crotonic acid compounds such as meptyldinocap;
antibiotics such as validamycin, kasugamycin, polyoxins and fenpicoxamid;
guanidine compounds such as iminoctadine and dodine;
quinoline compounds such as tebufloquin, quinoxyfen and quinofumelin;
thiazolidine compounds such as flutianil;
carbamate compounds such as propamocarb hydrochloride, pyribencarb, tolprocarb and picarbutrazox;
sulfur compounds such as sulfur and lime sulfur;
and other compounds such as isoprothiolane, pyroquilon, diclomezine, chloropicrin, dazomet, metam-sodium, nicobifen, diclocymet, proquinazid, fluopicolide, carpropamid, ferimzone, spiroxamine, fenpyrazamine, ametoctradin, oxathiapiprolin, dipymetitrone, acibenzolar-s-methyl, dichlobentiazox, SB-4303, BAF-1107, MIF-1002, KUF-1411, BAF-1120, BAF-1510, BAF-1511, NF-180, S-2399, SYJ-259, AKD-5195, BYF-1303, S-2367, S-2190, BAF-1401, KF-37 and KYIF-1402.

Microbial fungicides include *Bacillus* amyloliqefaciens strain QST713, *Bacillus* amyloliqefaciens strain FZB24, *Bacillus* amyloliqefaciens strain MB1600, *Bacillus* amyloliqefaciens strain D747, *Pseudomonas fluorescens*, *Bacillus subtilis* and *Trichoderma* atroviride SKT-1.

Plant extracts include tea tree oil.

The insecticide, the miticide, the nematicide or the soil insect pesticide in the above-mentioned other agricultural chemicals, that is, the active ingredient compounds of insect pest control agents, may properly be selected, for example, from the following group of compounds (by common names or test codes of Japan Plant Protection Association). In a case where these compounds have their salts, alkyl esters, various structural isomers such as optical isomers, etc., all of them are included, even if no specific disclosure thereof is made.

Organic phosphate compounds, such as profenofos, dichlorvos, fenamiphos, fenitrothion, EPN ((RS)—(O-ethyl O-4-nitrophenyl phenylphosphonothioate), diazinon, chlorpyrifos, chlorpyrifos-methyl, acephate, prothiofos, fosthiazate, cadusafos, disulfoton, isoxathion, isofenphos, ethion, etrimfos, quinalphos, dimethylvinphos, dimethoate, sulprofos, thiometon, vamidothion, pyraclofos, pyridaphenthion, pirimiphos-methyl, propaphos, phosalone, formothion, malathion, tetrachlorvinphos, chlorfenvinphos, cyanophos, trichlorfon, methidathion, phenthoate, oxydeprofos (another name: ESP), azinphos-methyl, fenthion, heptenophos, methoxychlor, parathion, phosphocarb, demeton-S-methyl, monocrotophos, methamidophos, imicyafos, parathion-methyl, terbufos, phosphamidon, phosmet and phorate;

carbamate compounds, such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC (3,5-xylyl methylcarbamate) and fenothiocarb;

nereistoxin derivatives, such as cartap, thiocyclam, thiocyclam oxalate, thiocyclam hydrochloride, bensultap, thiosultap, monosultap (another name: thiosultap-monosodium), bisultap (another name: thiosultap-disodium) and polythialan;

organic metal compounds, such as fenbutatin oxide and cyhexatin;

pyrethroid compounds, such as fenvalerate, permethrin, cypermethrin, alpha-cypermethrin), zeta-cypermethrin, theta-cypermethrin, beta-cypermethrin, deltamethrin, cyhalothrin, gamma-cyhalothrin, lambda-cyhalothrin, tefluthrin, kappa-tefluthrin, ethofenprox, flufenprox, cyfluthrin, beta-cyfluthrin, fenpropathrin, flucythrinate, fluvalinate, cycloprothrin, pyrethrins, esfenvalerate, tetramethrin, resmethrin, protrifenbute, bifenthrin, kappa-bifenthrin, acrinathrin, allethrin, tau-fluvalinate, tralomethrin, profluthrin, metofluthrin, epsilon-metofluthrin, heptafluthrin, phenothrin, flumethrin, momfluorothrin, epsilon-momfluorothrin, silafluofen and chloroprallethrin;

benzoylurea compounds, such as diflubenzuron, chlorfluazuron, teflubenzuron, flufenoxuron, lufenuron, novaluron, triflumuron, hexaflumuron, bistrifluron, noviflumuron and fluazuron;

juvenile hormone-like compounds, such as methoprene, pyriproxyfen, fenoxycarb and diofenolan;

pyridazinone compounds, such as pyridaben;

pyrazole compounds, such as fenpyroximate, fipronil, tebufenpyrad, ethiprole, tolfenpyrad, acetoprole, pyrafluprole, pyriprole, cyenopyrafen, pyflubumide and flufiprole;

neonicotinoid compounds, such as imidacloprid, nitenpyram, acetamiprid, thiacloprid, thiamethoxam, clothianidin, nidinotefuran, dinotefuran and nithiazine;

hydrazine compounds, such as tebufenozide, methoxyfenozide, chromafenozide and halofenozide;

pyridine compounds, such as pyridalyl and flonicamid;

cyclic keto-enol compounds, such as spirodiclofen, spiromesifen and spirotetramat;

strobilurin compounds, such as fluacrypyrim and pyriminostrobin;

pyrimidinamine compounds, such as flufenerim and pyrimidifen;

organic sulfur compounds, such as malathion;

triazine compounds, such as cyromazine;

hydrazone compounds, such as hydramethylnon;

diamide compounds, such as flubendiamide, chlorantraniliprole, cyantraniliprole, cyclaniliprole, tetraniliprole, broflanilide and cyhalodiamide;

thiourea compounds, such as diafenthiuron and chloromethiuron;

formamidine compounds, such as amitraz, chlordimeform and chloromebuform;

butenolide compounds, such as flupyradifurone; and other compounds, such as buprofezin, hexythiazox, triazamate, pymetrozine, chlorfenapyr, indoxacarb, acequinocyl, etoxazole, 1,3-dichloropropene, benclothiaz, bifenazate, propargite, clofentezine, metaflumizone, cyflumetofen, pyrifluquinazone, fenazaquin, amidoflumet, sulfluramid, hydramethylnon, metaldehyde, sulfoxaflor, fluensulfone, verbutin, dicloromezotiaz, triflumezopyrim, fluhexafon, tioxazafen, afidopyropen, flometoquin, fluazaindolizine and fluxametamide.

Further, it may be mixed with or used in combination with microbial agricultural chemicals, such as insecticidal crystal proteins produced by *Bacillus thuringiensis aizawai, Bacillus thuringiensis* kurstaki, *Bacillus thuringiensis israelensis, Bacillus thuringiensis japonensis, Bacillus thuringiensis* tenebrionis or *Bacillus thuringiensis*, insect viruses, entomopathogenic fungi, and nematophagous fungi:

antibiotics or semisynthetic antibiotics, such as avermectin, emamectin benzoate, milbemectin, milbemycin, spinosad, ivermectin, lepimectin, abamectin, emamectin and spinetoram;

natural products, such as azadirachtin, rotenone, and ryanodine; and repellents, such as deet.

The formulation of the present invention or a diluted product thereof may be applied by a commonly used application method, such as spraying (such as spraying, jetting, misting, atomizing, powder or grain scattering, or dispersing in water), soil application (such as mixing or drenching), surface application (such as coating, powdering, smearing or covering) or seed treatment. Further, it may be applied also by a so-called ultra low-volume application method. In this method, the formulation may be composed of 100% of the active ingredients.

The application amounts of the component (a) and the component (b) as the active ingredients of the present invention cannot generally be defined since they vary depending upon the conditions such as the plants to be treated, the application method, the type of the formulation, the dose and the application time. For example, in the case of foliar application, the total amount of the active ingredients of the present invention is usually from 5 to 10,000 g/ha, preferably from 10 to 5,000 g/ha, more preferably from 100 to 2,500 g/ha. In the case of seed treatment, the total application amount of the active ingredients of the present invention is usually from 1 to 2,000 g, preferably from 1 to 1,000 g, more preferably from 1 to 500 g per 100 kg of the seed weight. In the case of soil application, the total amount of the active ingredients of the present invention is usually from 5 to 10,000 g/ha, preferably from 10 to 5,000 g/ha, more preferably from 100 to 1,000 g/ha.

The concentration of the active ingredients in the present invention cannot generally be defined since it varies depending upon the conditions such as the plants to be treated, the application method, the type of the formulation, the dose and the application time. For example, in the case of foliar application or soil application, the concentration is usually from 0.01 ppm to 100,000 ppm, preferably from 0.1 ppm to 10,000 ppm, more preferably from 1 ppm to 1,000 ppm. In the case of seed treatment, the concentration is usually from 0.25 to 500 g/100 kg seed, preferably from 10 to 200 g/100 kg seed.

The weight ratio of the component (a) to the component (b) is not particularly limited and may be adjusted within a relatively wide range depending upon the plants to be treated, the application site and the application method. The weight ratio of the component (a) to the component (b) is usually from 1:10,000 to 10,000:1, preferably from 1:5,000 to 500:1, more preferably from 1:500 to 50:1.

Preferred embodiments of the present invention will be described below.

(1) A method for enhancing plant disease controlling effects of an aryl phenyl ketone fungicide, which comprises using an aryl phenyl ketone fungicide as a component (a) in combination with at least one component (b) selected from the group consisting of a nonionic surfactant, an anionic surfactant, a cationic surfactant, a vegetable oil, a paraffin, a resin and a terpene.

(2) The method according to (1), wherein the component (a) is at least one member selected from the group consisting of pyriofenone and metrafenone.

(3) The method according to (1), wherein the component (a) is pyriofenone.

(4) The method according to (1), wherein the component (a) is metrafenone.

(5) The method according to any one of (1) to (4), wherein the component (b) is at least one component selected from the group consisting of a nonionic surfactant, a paraffin and a vegetable oil.

(6) The method according to any one of (1) to (4), wherein the component (b) is a nonionic surfactant.

(7) The method according to any one of (1) to (6), wherein the nonionic surfactant is at least one member selected from the group consisting of a silicone surfactant, a polyoxyethylene surfactant, a polyhydric alcohol surfactant and an alkanolamide surfactant.

(8) The method according to any one of (1) to (7), wherein the nonionic surfactant is a silicone surfactant.

(9) The method according to any one of (1) to (7), wherein the component (b) is a silicone surfactant.

(10) The method according to any one of (1) to (4), wherein the component (b) is a silicone surfactant and a polyoxyethylene surfactant.

(11) The method according to any one of (1) to (4), wherein the component (b) is a silicone surfactant and a vegetable oil.

(12) The method according to any one of (1) to (4), wherein the component (b) is a polyoxyethylene surfactant and a vegetable oil.

(13) The method according to any one of (1) to (4), wherein the component (b) is a silicone surfactant, a polyoxyethylene surfactant and a vegetable oil.

(14) The method according to any one of (1) to (4), wherein the component (b) is a polyoxyethylene surfactant, a vegetable oil and a paraffin.

(15) The method according to any one of (1) to (4), wherein the component (b) is a polyoxyethylene surfactant, a vegetable oil and a sulfonate surfactant.

(16) The method according to any one of (1) to (4), wherein the component (b) is a polyhydric alcohol surfactant.

(17) The method according to any one of (1) to (4), wherein the component (b) is a polyhydric alcohol surfactant and a vegetable oil.

(18) The method according to any one of (1) to (4), wherein the component (b) is a polyhydric alcohol surfactant and a paraffin.

(19) The method according to any one of (1) to (4), wherein the anionic surfactant is at least one member selected from the group consisting of a sulfate surfactant and a phosphate surfactant.

(20) The method according to any one of (1) to (4), wherein the anionic surfactant is at least one member selected from the group consisting of a sulfate surfactant and a phosphate surfactant.

(21) The method according to any one of (1) to (4), wherein the component (b) is a phosphate surfactant.

(22) The method according to any one of (1) to (4), wherein the component (b) is a sulfate surfactant and an alkanolamide surfactant.

(23) The method according to any one of (1) to (4), wherein the cationic surfactant is at least one member selected from the group consisting of an ethoxylated aliphatic amine surfactant, a dialkylammonium salt surfactant and an alkylammonium salt surfactant.

(24) The method according to any one of (1) to (4), wherein the cationic surfactant is at least one member selected from the group consisting of an ethoxylated aliphatic amine surfactant, a dialkylammonium salt surfactant and an alkylammonium salt surfactant.

(25) The method according to any one of (1) to (4), wherein the component (b) is a vegetable oil.
(26) The method according to any one of (1) to (4) and (25), wherein the vegetable oil is at least one member selected from tall oil, tall oil fatty acid, tall oil fatty acid methyl ester, coconut oil, soybean oil, methylated soybean oil, rapeseed oil, methylated rapeseed oil and ethylated rapeseed oil.
(27) The method according to any one of (1) to (4), wherein the component (b) is a paraffin.
(28) The method according to any one of (1) to (27), wherein the mixing weight ratio of the component (a) to the component (b) is from 1:5,000 to 500:1.
(29) The method according to any one of (1) to (3) and (5) to (27), wherein the component (a) is pyriofenone, and the mixing weight ratio of the component (a) to the component (b) is from 15:1 to 1:400.
(30) The method according to any one of (1), (2) and (4) to (27), wherein the component (a) is metrafenone, and the mixing weight ratio of the component (a) to the component (b) is from 50:1 to 1:150.
(31) A method for controlling plant diseases, which comprises applying an aryl phenyl ketone fungicide as a component (a) in combination with at least one component (b) selected from the group consisting of a nonionic surfactant, an anionic surfactant, a cationic surfactant, a vegetable oil, a paraffin, a resin and a terpene, to plants or to soil where they grow.
(32) The method according to (31), wherein the component (a) is at least one member selected from the group consisting of pyriofenone and metrafenone.
(33) The method according to (31), wherein the component (a) is pyriofenone.
(34) The method according to (31), wherein the component (a) is metrafenone.
(35) The method according to any one of (31) to (34), wherein the component (b) is at least one member selected from the group consisting of a nonionic surfactant, a paraffin and a vegetable oil.
(36) The method according to any one of (31) to (34), wherein the component (b) is a nonionic surfactant.
(37) The method according to any one of (31) to (34), wherein the nonionic surfactant is at least one member selected from the group consisting of a silicone surfactant, a polyoxyethylene surfactant, a polyhydric alcohol surfactant and an alkanolamide surfactant.
(38) The method according to any one of (31) to (34), wherein the nonionic surfactant is a silicone surfactant.
(39) The method according to any one of (31) to (34), wherein the component (b) is a silicone surfactant.
(40) The method according to any one of (32) to (35), wherein the component (b) is a silicone surfactant and a polyoxyethylene surfactant.
(41) The method according to any one of (31) to (34), wherein the component (b) is a silicone surfactant and a vegetable oil.
(42) The method according to any one of (31) to (34), wherein the component (b) is a polyoxyethylene surfactant and a vegetable oil.
(43) The method according to any one of (31) to (34), wherein the component (b) is a silicone surfactant, a polyoxyethylene surfactant and a vegetable oil.
(44) The method according to any one of (31) to (34), wherein the component (b) is a polyoxyethylene surfactant, a vegetable oil and a paraffin.
(45) The method according to any one of (31) to (34), wherein the component (b) is a polyoxyethylene surfactant, a vegetable oil and a sulfonate surfactant.
(46) The method according to any one of (31) to (34), wherein the component (b) is a polyhydric alcohol surfactant.
(47) The method according to any one of (31) to (34), wherein the component (b) is a polyhydric alcohol surfactant and a vegetable oil.
(48) The method according to any one of (31) to (34), wherein the component (b) is a polyhydric alcohol surfactant and a paraffin.
(49) The method according to any one of (31) to (34), wherein the anionic surfactant is at least one member selected from the group consisting of a sulfate surfactant and a phosphate surfactant.
(50) The method according to (31) or (35), wherein the cationic surfactant is at least one member selected from the group consisting of an ethoxylated aliphatic amine surfactant, a dialkylammonium salt surfactant and an alkylammonium salt surfactant.
(51) The method according to any one of (31) to (34), wherein the cationic surfactant is at least one member selected from the group consisting of an ethoxylated aliphatic amine surfactant, a dialkylammonium salt surfactant and an alkylammonium salt surfactant.
(52) The method according to any one of (31) to (34), wherein the component (b) is a vegetable oil.
(53) The method according to any one of (31) to (34) and (52), wherein the vegetable oil is at least one member selected from the group consisting of tall oil, tall oil fatty acid, tall oil fatty acid methyl ester, coconut oil, soybean oil, methylated soybean oil, rapeseed oil, methylated rapeseed oil and ethylated rapeseed oil.
(54) The method according to any one of (31) to (34), wherein the component (b) is a paraffin.
(55) The method according to any one of (31) to (34), wherein the mixing weight ratio of the component (a) to the component (b) is from 1:5,000 to 500:1.
(56) The method according to any one of (31) to (33) and (35) to (54), wherein the component (a) is pyriofenone, and the mixing weight ratio of the component (a) to the component (b) is from 15:1 to 1:400.
(57) The method according to any one of (31), (32) and (34) to (54), wherein the component (a) is metrafenone, and the mixing weight ratio of the component (a) to the component (b) is from 50:1 to 1:150.
(58) The method according to any one of (1) to (57), wherein the plant to be protected is cucumber.
(59) The method according to any one of (1) to (57), wherein the plant to be protected is sweet pepper.
(60) The method according to any one of (1) to (59), wherein the plant disease is powdery mildew.

EXAMPLES

Now, Test Examples of the present invention will be described, however, it should be understood that the present invention is by no means restricted to such specific Examples.

Test Example 1 (Test on Curative Effect Against Cucumber Powdery Mildew with Different Temperatures)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. or 28° C. under the light for 3 days, and a chemical solution containing pyriofenone was applied (dosage: 90 g ai/ha, amount of solution applied: 800 L/ha) to the leaf adaxial surface by a spray gun. After the chemical solution dried, the cucumber was cultivated in a room at 20° C. or 28° C. under the light for 6 days. The lesion area ratio on the adaxial surface of the first leaf was examined, and the control value was calculated based on the following formula.

Control value=(1−a/b)×100 a: lesion area ratio in treated plot, b: lesion area ratio in non-treated plot

TABLE 1

| Temperature | Control value |
|---|---|
| 20° C. | 53 |
| 28° C. | 80 |

As shown in this Example, without component (b), the control value of the aryl phenyl ketone fungicide may sometimes decrease when the temperature is low as compared with when the temperature is high. However, as shown in the following Test Examples, by addition of the component (b), the plant disease controlling effects of an aryl phenyl ketone fungicide may be enhanced even when the temperature is low.

Test Example 2 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone prepared with an aqueous solution containing each product (0.5 v/v°/0) was applied (dosage: 90 g ai/ha, amount of solution applied: 800 L/ha) to the leaf adaxial surface by a spray gun. After the chemical solution dried, the cucumber was cultivated in a room at 20° C. under the light for 6 days. The lesion area ratio on the adaxial surface of the first leaf was examined, and the control value was calculated based on the following formula. In Tables, "no addition" means the above treatment without adding the component (b) (the same applies hereinafter).

Control value=(1−a/b)×100 a: lesion area ratio in treated plot, b: lesion area ratio in non-treated plot

TABLE 2-1

| Product (tradename) | Component (b) | Control value |
|---|---|---|
| AGRIDEX (specific gravity: 0.86) | Paraffin-based petroleum, Polyhydric alcohol fatty acid ester, Polyhydric alcohol polyethylene oxide fatty acid ester | 92.5 |
| ASSIST (specific gravity: 0.89) | Paraffin-based mineral oil | 100 |
| BREAK-THRU OE441 (specific gravity: 1.04) | Polyether siloxane | 95 |
| BREAK-THRU S240 (specific gravity: 1.02) | Polyether trisiloxane | 100 |
| DESTINY (specific gravity: 0.91) | Methylated soybean oil, Sorbitan fatty acid ester | 95 |
| KINETIC (specific gravity: 1.03) | Polyoxyalkylene oxide-modified polymethylsiloxane | 100 |
| PRIME OIL (specific gravity: 0.86) | Paraffin oil, Polyoxyethylene alkyl phenyl ether, Tall oil | 100 |
| SURFIX (specific gravity: 0.95) | β-pinene polymer | 85 |
| NU FILM P (specific gravity: 0.92) | Pinene (polyterpene) polymer | 70 |
| NU FILM 17 (specific gravity: 0.96) | Pinene (diterpene) polymer | 70 |
| No addition | | 55 |

TABLE 2-2

| Product (tradename) | Component (b) | Control value |
|---|---|---|
| DYNE-AMIC (specific gravity: 0.91) | Polyoxyethylene dimethylsiloxane, Methylated seed oil | 97.5 |
| INDUCE (specific gravity: 1.02) | Alkylaryl polyoxyalkene ether | 92.5 |
| COHERE (specific gravity: 1.02) | Ethanolamine, Triethanolamine, Polyoxyethylene alkyl aryl sulfate | 97.5 |
| R-11 (specific gravity: 1.03) | Polyoxyethylene nonyl phenol | 100 |
| SYL-COAT (specific gravity: 1.04) | Polyether/polymethylsiloxane copolymer | 100 |
| SYL-TAC (specific gravity: 0.93) | Mixture of ethylated rapeseed oil and methylated rapeseed oil, Hydroxypropyl heptamethyltrisiloxane, Polyoxyethylene octyl phenyl ether | 85 |
| ENTRY (specific gravity: 0.92) | Tall oil fatty acid methyl ester, N,N-bis2-omega-hydroxypolyoxyethylene alkylamine | 85 |
| ADWET90 (specific gravity: 1.04) | Polyoxyethylene alkyl phenyl ether, Tall oil fatty acid | 92.5 |
| LATRON B-1956 (specific gravity: 0.98) | Phthalic acid-modified glycerol alkyd resin | 75 |
| QUARK (specific gravity: 1.05) | Polyether-modified polysiloxane, Alkyl phenol ethoxylate | 100 |
| SILGLOW (specific gravity: 1.04) | Hydroxypropyl heptamethyltrisiloxane | 95 |
| SILWET L77 (specific gravity: 1.01) | Polyalkylene oxide-modified heptamethyltrisiloxane | 100 |

Test Example 3 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone prepared with an aqueous solution containing each product (0.05 to 0.25 v/v°/0) was applied (dosage: 90 g ai/ha, amount of solution applied: 800 L/ha) to the leaf adaxial surface by a spray gun. After the chemical solution dried, the cucumber was cultivated in a room at 20° C. under the light for 6 days. The lesion area ratio on the first leaf was examined, and the control value was calculated based on the following formula.

Control value=(1−a/b)×100 a: lesion area ratio in treated plot, b: lesion area ratio in non-treated plot

TABLE 3

| Product (tradename) and concentration | Component (b) | Control value |
|---|---|---|
| AGRIDEX 0.25 v/v % | Paraffin-based petroleum, Polyhydric alcohol fatty acid ester, Polyhydric alcohol polyethylene oxide fatty acid ester | 75 |
| ASSIST 0.25 v/v % | Paraffin-based mineral oil | 75 |
| BREAK-THRU OE441 0.25 v/v % | Polyether siloxane | 90 |
| BREAK-THRU S240 0.05 v/v % | Polyether trisiloxane | 80 |
| DESTINY 0.25 v/v % | Methylated soybean oil, Sorbitan fatty acid ester | 92.5 |
| KINETIC 0.25 v/v % | Polyoxyalkylene oxide-modified polymethylsiloxane | 85 |
| PRIME OIL 0.25 v/v % | Paraffin oil, Polyoxyethylene alkyl phenyl ether, Tall oil | 92.5 |
| DYNE-AMIC 0.25 v/v % | Polyoxyethylene dimethylsiloxane, Methylated seed oil | 90 |
| INDUCE 0.05 v/v % | Alkylaryl polyoxyalkene ether | 75 |
| COHERE 0.25 v/v % | Ethanolamine, Triethanolamine, Polyoxyethylene alkyl aryl sulfate | 92.5 |
| R-11 0.05 v/v % | Polyoxyethylene nonyl phenol | 70 |
| SYL-COAT 0.05 v/v % | Polyether/polymethylsiloxane copolymer | 75 |
| ADWET90 0.25 v/v % | Polyoxyethylene alkyl phenyl ether, tall oil fatty acid | 75 |
| QUARK 0.25 v/v % | Polyether-modified polysiloxane, Alkyl phenol ethoxylate | 85 |
| SILGLOW 0.05 v/v % | Hydroxypropyl heptamethyltrisiloxane | 70 |
| SILWET L77 0.05 v/v % | Polyalkylene oxide-modified heptamethyltrisiloxane | 92.5 |
| No addition | | 55 |

Test Example 4 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light to for 3 days, and a chemical solution containing pyriofenone prepared with an aqueous solution containing each product (0.025 to 0.25 v/v°/0) was applied (dosage: 90 g ai/ha, amount of solution applied: 800 L/ha) to the leaf adaxial surface by a spray gun. After the chemical solution dried, the cucumber was cultivated in a greenhouse for 4 days and then cultivated in a room at 20° C. under the light for 5 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 4

| Product (tradename) and concentration | Component (b) | Control value |
|---|---|---|
| BREAK-THRU S240 0.025 v/v % | Polyether trisiloxane | 70 |
| BREAK-THRU S233 0.25 v/v % (specific gravity: 1.03) | Polyether trisiloxane | 92.5 |
| SYL-COAT 0.025 v/v % | Polyether/polymethylsiloxane copolymer | 75 |
| SILWET L77 0.025 v/v % | Polyalkylene oxide-modified heptamethyltrisiloxane | 85 |
| No addition | | 30 |

Test Example 5 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone (dosage: 90 g ai/ha) or metrafenone (300 g ai/ha) prepared with an aqueous solution containing each product (0.025 to 4.0 v/v°/0) was applied (amount of solution applied: 800 L/ha) to the leaf adaxial surface by a spray gun. After the chemical solution dried, the cucumber was cultivated in a room at 20° C. under the light for 7 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 5

| Product (tradename) | Component (b) | Concentration (v/v %) | Control value Pyriofenone | Control value Metrafenone |
|---|---|---|---|---|
| ASSIST | Paraffin-based mineral oil | 0.125 | 97.2 | 91.4 |
| | | 4.0 | 100 | 100 |
| AGRIDEX | Paraffin-based petroleum, Polyhydric alcohol fatty acid ester, Polyhydric alcohol polyethylene oxide fatty acid ester | 0.5 | 100 | 94.3 |
| | | 1.0 | 100 | 97.1 |
| PRIME OIL | Paraffin oil, Polyoxyethylene alkyl phenyl ether, Tall oil | 0.125 | 95.4 | 97.1 |
| DYNE-AMIC | Polyoxyethylene dimethylsiloxane, Methylated seed oil | 0.47 | 94.4 | 97.1 |
| | | 4.0 | 100 | 100 |
| BREAK-THRU S240 | Polyether trisiloxane | 0.025 | 77.8 | 88.6 |
| | | 0.25 | 97.2 | 100 |

TABLE 5-continued

| Product (tradename) | Component (b) | Concentration (v/v %) | Control value Pyriofenone | Control value Metrafenone |
|---|---|---|---|---|
| SYL-COAT | Polyether/polymethylsiloxane copolymer | 0.03 | 83.3 | 82.9 |
| | | 0.18 | 91.7 | 100 |
| SILGLOW | Hydroxypropyl heptamethyltrisiloxane | 0.03 | 83.3 | 71.4 |
| | | 0.18 | 91.7 | 94.3 |
| SILWET L77 | Polyalkylene oxide-modified heptamethyltrisiloxane | 0.025 | 83.3 | 91.4 |
| | | 0.25 | 100 | 100 |
| KINETIC | Polyoxyalkylene oxide-modified polymethylsiloxane | 0.25 | 100 | 100 |
| | | 0.5 | 100 | 100 |
| INDUCE | Alkylaryl polyoxyalkene ether | 0.125 | 77.8 | 97.1 |
| | | 0.5 | 94.4 | 94.3 |
| R-11 | Polyoxyethylene nonyl phenol | 0.24 | 100 | 100 |
| COHERE | Ethanolamine, Triethanolamine, Polyoxyethylene alkyl aryl sulfate | 0.125 | 83.3 | 88.6 |
| | | 2.3 | 100 | 100 |
| No addition | | | 63 | 65.7 |

Test Example 6 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone (dosage: 90 g ai/ha) or metrafenone (300 g ai/ha) prepared with an aqueous solution containing each product (0.01 to 5.0 v/v°/0) was applied (amount of solution applied: 800 L/ha) to the leaf adaxial surface by a spray gun. After the chemical solution dried, the cucumber was cultivated in a room at 20° C. under the light for 6 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 6

| Product (tradename) | Component (b) | Concentration (v/v %) | Control value Pyriofenone | Control value Metrafenone |
|---|---|---|---|---|
| DESTINY HC (specific gravity: 1.01) | Methylated soybean oil, sorbitan fatty acid ester | 0.01 | 77.3 | 83 |
| | | 0.125 | 94.3 | 88.6 |
| | | 1.0 | 100 | 100 |
| | | 5.0 | 100 | 100 |
| No addition | | | 71.6 | 60.2 |

Test Example 7 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone (dosage: 90 g ai/ha) or metrafenone (300 g ai/ha) prepared with an aqueous solution containing each product (0.02 to 0.07 v/v°/0) was applied (amount of solution applied: 800 L/ha) to the leaf adaxial surface by a spray gun. After the chemical solution dried, the cucumber was cultivated in a room at 20° C. under the light for 5 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 7

| Product (tradename) | Component (b) | Concentration (v/v %) | Control value Pyriofenone | Control value Metrafenone |
|---|---|---|---|---|
| PRIME OIL | Paraffin oil, | 0.02 | 80 | 85 |
| | Polyoxyethylene alkyl phenyl ether, Tall oil | 0.07 | 85 | 90 |
| No addition | | | 65 | 65 |

Test Example 8 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone (dosage: 90 g ai/ha) or metrafenone (300 g ai/ha) prepared with an aqueous solution containing each product (0.001 to 5.0 v/v°/0) was applied (amount of solution applied: 800 L/ha) to the leaf adaxial surface by a spray gun. After the chemical solution dried, the cucumber was cultivated in a room at 20° C. under the light for 7 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 8

| Product (tradename) | Component (b) | Concentration (v/v %) | Control value Pyriofenone | Control value Metrafenone |
|---|---|---|---|---|
| ASSIST | Paraffin-based mineral oil | 5.0 | 100 | 100 |
| AGRIDEX | Paraffin-based petroleum, | 0.05 | 70 | 90 |
| | Polyhydric alcohol fatty acid ester, Polyhydric alcohol polyethylene oxide fatty acid ester | 5.0 | 100 | 100 |
| DYNE-AMIC | Polyoxyethylene dimethylsiloxane, methylated seed oil | 0.05 | 80 | 80 |
| | | 5.0 | 100 | 100 |
| BREAK-THRU S240 | Polyether trisiloxane | 0.001 | 65 | 85 |
| | | 1.0 | 100 | 100 |
| SYL-COAT | Polyether/polymethylsiloxane copolymer | 0.001 | 60 | 70 |
| | | 1.0 | 100 | 100 |
| SILGLOW | Hydroxypropyl heptamethyltrisiloxane | 0.001 | 70 | 80 |
| | | 1.0 | 100 | 100 |
| SILWET L77 | Polyalkylene oxide-modified heptamethyltrisiloxane | 0.001 | 60 | 75 |
| | | 0.5 | 100 | 100 |
| KINETIC | Polyoxyalkylene oxide-modified polymethylsiloxane | 0.01 | 75 | 85 |
| | | 1.0 | 100 | 100 |
| INDUCE | Alkylaryl polyoxyalkene ether | 0.01 | 65 | 80 |
| | | 1.0 | 98 | 100 |
| R-11 | Polyoxyethylene nonyl phenol | 0.001 | 70 | 65 |
| | | 1.0 | 100 | 100 |
| COHERE | Ethanolamine, Triethanolamine, Polyoxyethylene alkyl aryl sulfate | 0.01 | 65 | 80 |
| | | 5.0 | 100 | 100 |
| No addition | | | 65 | 60 |

Test Example 9 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 3 days, and a chemical solution containing pyriofenone (dosage: 90 g ai/ha) or metrafenone (300 g ai/ha) prepared with an aqueous solution containing each product (0.005 to 1.0 v/v°/0) was applied (amount of solution applied: 800 L/ha) to the leaf adaxial surface by a spray gun. After the chemical solution dried, the cucumber was cultivated in a room at 20° C. under the light for 7 days. The lesion area ratio on the first leaf was examined, and the control value was calculated based on the following formula.

Control value=$(1-a/b) \times 100$ a: lesion area ratio in treated plot, b: lesion area ratio in non-treated plot

TABLE 9

| Product (tradename) | Component (b) | Concentration (v/v %) | Control value Pyriofenone | Control value Metrafenone |
|---|---|---|---|---|
| PLYSURF A212C (specific gravity: 1.03) | Polyoxyethylene tridecyl ether phosphate | 0.5 | 87.5 | 97.5 |
| | | 0.1 | 80 | 97.5 |
| | | 0.05 | 92.5 | 97.5 |
| | | 0.01 | 85 | 90 |
| | | 0.005 | 80 | 75 |
| CATIOGEN TML (specific gravity: 0.98) | Lauryl trimethylammonium chloride | 1.0 | 100 | 100 |
| | | 0.5 | 100 | 97.5 |
| | | 0.1 | 90 | 95 |
| | | 0.05 | 85 | 90 |
| No addition | | | 70 | 75 |

Test Example 10 (Test on Penetration Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, a chemical solution containing pyriofenone (dosage: 90 g ai/ha) prepared with an aqueous solution containing each product (0.015 to 4.0 v/v %) was applied (amount of solution applied: 800 L/ha) to the leaf adaxial surface by a spray gun. After the chemical solution dried, the cucumber was cultivated in a room at 20° C. under the light for 4 days, the leaf abaxial surface was sprayed and inoculated with a suspension of conidia of *Sphaerotheca fuliginea*, and the cucumber was cultivated in a room at 20° C. under the light for 8 days. The lesion area ratio on the abaxial side of the first leaf was examined, and the control value was calculated based on the following formula.

Control value=(1−a/b)×100 a: lesion area ratio in treated plot, b: lesion area ratio in non-treated plot

TABLE 10

| Product (tradename) | Component (b) | Concentration (v/v %) | Control value |
|---|---|---|---|
| ASSIST | Paraffin-based mineral oil | 0.125 | 100 |
| | | 4.0 | 85 |
| AGRIDEX | Paraffin-based petroleum, | 0.5 | 100 |
| | Polyhydric alcohol fatty acid ester, Polyhydric alcohol polyethylene oxide fatty acid ester | 1.0 | 100 |
| DESTINY HC | Methylated soybean oil, | 0.125 | 100 |
| | Sorbitan fatty acid ester | 1.0 | 100 |
| DYNE-AMIC | Polyoxyethylene dimethylsiloxane, | 0.47 | 100 |
| | Methylated seed oil | 1.0 | 95 |
| | | 4.0 | 80 |
| SILWET L77 | Polyalkylene oxide-modified heptamethyltrisiloxane | 0.025 | 82 |
| | | 0.25 | 97 |
| KINETIC | Polyoxyalkylene oxide-modified polymethylsiloxane | 0.25 | 100 |
| | | 0.5 | 100 |
| R-11 | Polyoxyethylene nonyl phenol | 0.015 | 95 |
| | | 0.24 | 90 |
| PLYSURF A212C | Polyoxyethylene tridecyl ether phosphate | 0.1 | 92 |
| | | 0.5 | 100 |
| No addition | | | 12 |

Test Example 11 (Test on Curative Effect Against Sweet Pepper Powdery Mildew)

Sweet pepper (cultivar: Kyonami) was cultivated in a polyethylene pot having a diameter of 7.5 cm, and when the sweet pepper reached 8.5 leaf stage, the sweet pepper was dusted and inoculated with a suspension of conidia of *Oidiopsis sicula Scalia*, the sweet pepper was cultivated in a greenhouse under the light for 3 days, and a chemical solution containing pyriofenone (dosage: 90 g or 110 g ai/ha) prepared with an aqueous solution containing each product (0.07 to 4.0 v/v %) was applied (amount of solution applied: 600 L/ha) to the leaf adaxial surface by a spray gun. After the chemical solution dried, the cucumber was cultivated in a greenhouse under the light for 17 days. Each of eight lower leaves was investigated, and the disease severity was calculated in accordance with the following index. Further, the control value was calculated from the disease severity.

Disease index 0: No spore formation

Disease index 1: Formation of lesion (spores, foot cells, conidiogenous cells) is observed on the leaf abaxial side with an area of less than 10%.

Disease index 2: Formation of lesion (spores, foot cells, conidiogenous cells) is observed on the leaf abaxial side with an area of from 10% to 25%.

Disease index 3: Formation of lesion (spores, foot cells, conidiogenous cells) is observed on the leaf abaxial side with an area of from 26% to 50%.

Disease index 4: Formation of lesion (spores, foot cells, conidiogenous cells) is observed on the leaf abaxial side with an area of from 51 to 75%.

Disease index 5: Formation of lesion (spores, foot cells, conidiogenous cells) is observed on the leaf abaxial side with an area of from 76% to 100%.

Disease severity={Σ(the number of lesioned leaves with each disease index×each index)}×100/ (number of lesioned leaves×5)

Control value=(1−a/b)×100 a: Disease severity in treated plot, b: Disease severity in non-treated plot

TABLE 11

| Product (tradename) | Component (b) | Concentration (v/v %) | Control value Dosage (g ai/ha) 90 | 110 |
|---|---|---|---|---|
| ASSIST | Paraffin-based mineral oil | 0.125 | 38.9 | 37.3 |
| | | 1.0 | 51.4 | 54.6 |
| | | 4.0 | 57.7 | 57.7 |
| AGRIDEX | Paraffin-based petroleum, | 0.5 | 54.6 | 49.9 |
| | Polyhydric alcohol fatty acid ester, Polyhydric alcohol polyethylene oxide fatty acid ester | 1.0 | 60.8 | 60.8 |
| PRIME OIL | Paraffin oil, Polyoxyethylene alkyl phenyl ether, Tall oil | 0.07 | 28 | 23.3 |
| DYNE-AMIC | Polyoxyethylene dimethylsiloxane, | 0.47 | 18.6 | 38.9 |
| | Methylated seed oil | 1.0 | 48.3 | 40.5 |
| | | 4.0 | 57.7 | 56.1 |
| SILWET L77 | Polyalkylene oxide-modified heptamethyltrisiloxane | 0.1 | 15.4 | 15.4 |
| | | 0.25 | 28 | 23.3 |
| KINETIC | Polyoxyalkylene oxide-modified polymethylsiloxane | 0.5 | 24.8 | 24.8 |
| DESTINY HC | Methylated soybean oil, | 0.125 | 28 | 34.2 |
| | Sorbitan fatty acid ester | 0.5 | 49.9 | 43.6 |
| | | 1.0 | 57.7 | 51.4 |
| COHERE | Ethanolamine, Triethanolamine, Polyoxyethylene alkyl aryl sulfate | 0.25 | 15.4 | 34.2 |
| No addition | | | 7.6 | 6.1 |

Test Example 12 (Test on Curative Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, the leaf adaxial surface was sprayed and inoculated with a suspension of conidia of *Sphaerotheca fuliginea*, the cucumber was cultivated in a room at 20° C. under the light for 4 days, and a chemical solution containing pyriofenone (dosage: 90 g ai/ha) prepared with an aqueous solution containing each product (0.015 to 0.5 v/v %) was applied (amount of solution applied: 800 L/ha) to the leaf adaxial surface by a spray gun. After the chemical solution dried, the cucumber was cultivated in a room at 20° C. under the light for 6 days. The lesion area ratio on the first leaf was examined, and the control value was calculated based on the following formula.

Control value=(1−a/b)×100 a: lesion area ratio in treated plot, b: lesion area ratio in non-treated plot

TABLE 12

| Product (tradename) | Component (b) | Concentration (v/v %) | Control value |
|---|---|---|---|
| PERSIST ULTRA (specific gravity: 0.90) | Methylated canola oil, Polyoxyethylene alkyl phenyl ether | 0.1 | 98 |
| | | 0.5 | 100 |
| Ad-Max 90 (specific gravity: 1.20) | Polyoxyethylene alkyl phenyl ether | 0.015 | 81 |
| | | 0.1 | 98 |
| | | 0.24 | 98 |
| QUARK | Polyether-modified polysiloxane, alkyl phenol ethoxylate | 0.045 | 86 |
| | | 0.1 | 94 |
| | | 0.24 | 94 |

TABLE 12-continued

| Product (tradename) | Component (b) | Concentration (v/v %) | Control value |
|---|---|---|---|
| VESTIS (specific gravity: 1.00) | Siloxane/polyalkylene oxide copolymer | 0.05 | 94 |
| | | 0.1 | 94 |
| | | 0.15 | 98 |
| AGRIDEX | Paraffin-based petroleum, Polyhydric alcohol fatty acid ester, Polyhydric alcohol polyethylene oxide fatty acid ester | 0.5 | 100 |
| No addition | | | 68 |

Test Example 13 (Test on Penetration Effect Against Cucumber Powdery Mildew)

Cucumber (cultivar: Sagamihanjiro Fushinari) was cultivated in a polyethylene pot having a diameter of 7.5 cm, and when the cucumber reached 1.5 leaf stage, a chemical solution containing pyriofenone (dosage: 90 g ai/ha) prepared with an aqueous solution containing each product (0.015 to 1.0 v/v°/0) was applied (amount of solution applied: 800 L/ha) to the leaf adaxial surface by a spray gun. After the chemical solution dried, the cucumber was cultivated in a room at 20° C. under the light for 3 days, the leaf abaxial surface was sprayed and inoculated with a suspension of conidia of *Sphaerotheca fuliginea*, and the cucumber was cultivated in a room at 20° C. under the light for 7 days. The lesion area ratio on the abaxial side of the first leaf was examined, and the control value was calculated based on the following formula.

Control value=(1−a/b)×100 a: lesion area ratio in treated plot, b: lesion area ratio in non-treated plot

TABLE 13

| Product (tradename) | Component (b) | Concentration (v/v %) | Control value |
|---|---|---|---|
| PERSIST ULTRA | Methylated canola oil, Polyoxyethylene alkyl phenyl ether | 0.1 | 100 |
| | | 0.5 | 100 |
| | | 1.0 | 100 |
| Ad-Max 90 | Polyoxyethylene alkyl phenyl ether | 0.015 | 64 |
| | | 0.1 | 100 |
| | | 0.24 | 100 |
| QUARK | Polyether-modified polysiloxane, alkyl phenol ethoxylate | 0.045 | 100 |
| | | 0.1 | 100 |
| | | 0.24 | 100 |
| VESTIS | Siloxane/polyalkylene oxide copolymer | 0.05 | 100 |
| | | 0.1 | 100 |
| | | 0.15 | 100 |
| AGRIDEX | Paraffin-based petroleum, Polyhydric alcohol fatty acid ester, Polyhydric alcohol polyethylene oxide fatty acid ester | 0.5 | 100 |
| No addition | | | 40 |

INDUSTRIAL APPLICABILITY

The method for enhancing plant diseases controlling effects of the present invention, which has stably high controlling effects against plant diseases, is useful for controlling plant diseases.

The entire disclosure of Japanese Patent Application No. 2016-81693 filed on Apr. 15, 2016 including specification, claims, drawings and summary is incorporated herein by reference in its entirety.

The invention claimed is:

1. A method for treating powdery mildew, which comprises:
    applying to a plant or to soil where the plant grows an aryl phenyl ketone fungicide as a component (a) in combination with a nonionic surfactant as a component (b),
    wherein the nonionic surfactant is a polyhydric alcohol surfactant,
    wherein the mixing weight ratio of the component (a) to the component (b) is from 1:500 to 50:1,
    wherein the component (a) is pyrofenone, and
    wherein the polyhydric alcohol surfactant is selected from a blend of methylated soybean oil and sorbitan fatty acid ester; and a blend of paraffin-based petroleum, polyhydric alcohol fatty acid ester, and polyhydric alcohol polyoxyethylene oxide fatty acid ester.

2. The method according to claim 1, wherein the component (b) comprises a vegetable oil.

3. The method according to claim 1, wherein the component (b) comprises a paraffin.

4. A method for controlling powdery mildew, which comprises:
    applying an aryl phenyl ketone fungicide as a component (a) in combination with a nonionic surfactant as a component (b), to plants or to soil where they grow,
    wherein the nonionic surfactant is at least one member selected from the group consisting of a polyhydric alcohol surfactant and an alkanolamide surfactant,
    wherein the mixing weight ratio of the component (a) to the component (b) is from 1:500 to 50:1,
    wherein the component (a) is pyrofenone, and
    wherein the polyhydric alcohol surfactant is selected from a blend of methylated soybean oil and sorbitan fatty acid ester; or a blend of paraffin-based petroleum, polyhydric alcohol fatty acid ester, and polyhydric alcohol polyoxyethylene oxide fatty acid ester.

5. The method according to claim 4, wherein the component (b) comprises vegetable oil.

6. The method according to claim 4, wherein the component (b) comprises a paraffin.

7. A method for controlling plant diseases, which comprises applying an aryl phenyl ketone fungicide as a component (a) in combination with a nonionic surfactant as a component (b), to plants or to soil where they grow,
    wherein the nonionic surfactant is at least one member selected from the group consisting of a polyhydric alcohol surfactant and an alkanolamide surfactant,
    wherein the mixing weight ratio of the component (a) to the component (b) is from 1:500 to 50:1,
    wherein the component (a) is pyrofenone, and
    wherein the polyhydric alcohol surfactant is selected from a blend of methylated soybean oil and sorbitan fatty acid ester; or a blend of paraffin-based petroleum, polyhydric alcohol fatty acid ester, and polyhydric alcohol polyoxyethylene oxide fatty acid ester.

8. The method according to claim 1, wherein the alkanolamide surfactant is a mixture of ethanolamine, triethanolamine, and polyoxyethylene alkyl aryl sulfate.

9. The method according to claim 4, wherein the alkanolamide surfactant is a mixture of ethanolamine, triethanolamine, and polyoxyethylene alkyl aryl sulfate.

10. The method according to claim 7, wherein the nonionic surfactant is the polyhydric alcohol surfactant.

* * * * *